(12) United States Patent
Honda

(10) Patent No.: US 8,789,765 B2
(45) Date of Patent: Jul. 29, 2014

(54) POSITION CONTROL DEVICE, POSITION CONTROL METHOD, DRIVE DEVICE AND IMAGING DEVICE

(75) Inventor: Yasuhiro Honda, Takatsuki (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 791 days.

(21) Appl. No.: 12/993,725

(22) PCT Filed: May 11, 2009

(86) PCT No.: PCT/JP2009/058781
§ 371 (c)(1),
(2), (4) Date: Nov. 19, 2010

(87) PCT Pub. No.: WO2009/142122
PCT Pub. Date: Nov. 26, 2009

(65) Prior Publication Data
US 2011/0071663 A1 Mar. 24, 2011

(30) Foreign Application Priority Data
May 21, 2008 (JP) ................................. 2008-133220

(51) Int. Cl.
*G05D 23/02* (2006.01)
(52) U.S. Cl.
USPC ...................... 236/101 R; 236/101 E; 60/529
(58) Field of Classification Search
USPC ................... 236/101 R, 101–109, 87, 101 E; 318/582; 60/527–529
See application file for complete search history.

(56) References Cited

U.S. PATENT DOCUMENTS

| | | | | |
|---|---|---|---|---|
| 4,977,886 A | * | 12/1990 | Takehana et al. | 600/151 |
| 5,459,544 A | * | 10/1995 | Emura | 396/257 |
| 5,763,979 A | | 6/1998 | Mukherjee et al. | |
| 7,886,535 B2 | * | 2/2011 | Matsuki | 60/528 |
| 7,992,795 B2 | * | 8/2011 | Minor et al. | 236/103 |
| 8,068,167 B2 | * | 11/2011 | Honda et al. | 348/357 |
| 8,174,608 B2 | * | 5/2012 | Hara et al. | 348/357 |
| 2003/0079472 A1 | | 5/2003 | Hara et al. | |

(Continued)

FOREIGN PATENT DOCUMENTS

| | | |
|---|---|---|
| CN | 1681014 | 10/2005 |
| JP | 10-038708 | 2/1998 |

(Continued)

OTHER PUBLICATIONS

Office Action issued on Aug. 3, 2012 in the corresponding Chinese Patent Application No. 200980118507.4.

(Continued)

*Primary Examiner* — Marc Norman
(74) *Attorney, Agent, or Firm* — Cozen O'Connor

(57) ABSTRACT

A position control device 1 and a position control method of the present invention are a technology used in a shape memory alloy actuator for moving a movable member using a shape memory alloy member. In controlling the position of the movable member, an instruction value indicating a position of the movable member as a control target is changed to reduce the temperature of a shape memory alloy member when an amount of power supplied to the shape memory alloy member is in excess of a predetermined first threshold value. A drive device and an imaging device C of the present invention include a shape memory alloy actuator and the position control device 1.

17 Claims, 20 Drawing Sheets

(56) References Cited

U.S. PATENT DOCUMENTS

| | | |
|---|---|---|
| 2004/0022166 A1 | 2/2004 | Shoji et al. |
| 2005/0232617 A1 | 10/2005 | Uenaka et al. ............... 396/55 |
| 2007/0247101 A1* | 10/2007 | Noda et al. ................. 318/582 |
| 2008/0247748 A1* | 10/2008 | Tanimura et al. ............ 396/502 |
| 2011/0032628 A1* | 2/2011 | Tanimura et al. ............ 359/820 |

FOREIGN PATENT DOCUMENTS

| | | | |
|---|---|---|---|
| JP | 2005-308952 A1 | | 11/2005 |
| JP | 2006-183564 A | | 7/2006 |
| JP | 2006-283575 A | | 10/2006 |
| JP | 2007333792 A | * | 12/2007 |
| JP | 2010133350 A | * | 6/2010 |
| WO | WO 2009/142122 A1 | | 11/2009 |

OTHER PUBLICATIONS

Search Report dated May 7, 2013 issued in the corresponding European Patent Application No. 09 75 0484.9.

* cited by examiner

POSITION CONTROL DEVICE, POSITION CONTROL METHOD, DRIVE DEVICE AND IMAGING DEVICE

TECHNOLOGICAL FIELD

The present invention relates to a position control device and a position control method suitably used in a shape memory alloy actuator for moving a movable member using a shape memory alloy, for example, by a bias applying method and adapted to control the position of this movable member. The present invention also relates to a drive device and an imaging device including these position control device and shape memory alloy actuator.

BACKGROUND ART

A shape memory alloy (hereinafter, abbreviated as "SMA") has a crystal structure called an austenite phase (parent phase) at a high temperature side higher than a transformation temperature and a crystal structure called a martensite phase at a low temperature side. General metal materials do not return to their shapes before deformation once predetermined external forces are applied thereto. However, even if being deformed in a martensite phase by having a predetermined external force applied thereto, an SMA undergoes a phase transformation from the martensite phase to the austenite phase and returns to its original shape before deformation when temperature reaches a transformation temperature or above. By utilizing this property, actuators using SMAs (shape memory alloy actuators) have been developed.

Here, an actuator, which repeats operations in response to a temperature increase and a temperature decrease, is required to be bidirectional so as to correspond to this temperature transformation. However, the SMA returns to its original shape by being heated, but remains its returned memory shape even if being cooled, which means that the SMA is unidirectional. Thus, in one mode of a shape memory alloy actuator, a bias applying member is provided to apply an external force (bias) for deforming an SMA in a direction different from one direction after shape recovery, whereby two-way drive can be realized. Note that a push-pull method using an SMA is also known.

In a shape memory alloy actuator for moving a movable member using a shape memory alloy member (hereinafter, abbreviated as "SMA member") by such a bias applying method, the position of the movable member is controlled by a position control device taking advantage of properties shown in FIGS. 18 to 20.

FIG. 18 is a graph showing a relationship between a displacement of the movable member and a resistance value of the shape memory alloy member. A horizontal axis of FIG. 18 represents the displacement and a vertical axis thereof represents the resistance value. FIG. 19 is a graph showing a relationship between the displacement of the movable member and a drive current of the shape memory alloy member. A horizontal axis of FIG. 19 represents the displacement and a vertical axis thereof represents the drive current. FIG. 20 is a graph showing a relationship between an instruction value indicating a position of the movable member as a control target and the resistance value of the shape memory alloy member. A horizontal axis of FIG. 20 represents the instruction value and a vertical axis thereof represents the resistance value. FIG. 21 is a graph showing a relationship between the instruction value indicating the position of the movable member as the control target and the drive current of the shape memory alloy member. A horizontal axis of FIG. 21 represents the instruction value and a vertical axis thereof represents the drive current. FIG. 22 is a graph showing a relationship between the instruction value indicating the position of the movable member as the control target and the displacement of the movable member. A horizontal axis of FIG. 22 represents the instruction value and a vertical axis thereof represents the displacement.

The shape memory alloy actuator that moves the movable member using the SMA member that is, for example, expanded by the bias applying member in the martensite phase and returns to its memory shape in the austenite phase at the transformation temperature or higher reached by current heating, and restricts a movable range of the movable member to a predetermined range is described more specifically below. First of all, in a state of this shape memory alloy actuator in the martensite phase where the SMA member is expanded, a resistance value Rs of the SMA member is a maximum resistance value Rmax as shown in FIG. 18. A displacement of the movable member, in this case, is a minimum displacement Pmin (normally, displacement Pmin=0). A drive current Is of the SMA member is a minimum drive current Imin as shown in FIG. 19. This minimum drive current Imin is normally 0 or such a current value as not to displace the SMA member by a bias.

When the SMA member is current-heated in this state by increasing the drive current Is as shown in FIG. 19, the SMA member gradually contracts against the bias to return to its memory shape. Thus, the displacement, P, of the movable member gradually increases. In this case, the resistance value, Rs, of the SMA member gradually decreases as shown in FIG. 18. Eventually, a limit of the movable range of the movable member is reached and the displacement, P, of the movable member reaches a maximum displacement Pmax. In this case, the resistance value Rs of the SMA member appears to be a minimum resistance value Rmin. When a current is further applied for heating, the drive current Is of the SMA member reaches its maximum drive current Is as shown in FIG. 19. This maximum drive current Is is normally, for example, a maximum current value of a power supply. In this case, since the limit of the movable range of the movable member is already reached, the displacement P of the movable member is the maximum displacement Pmax, but the resistance value Is of the SMA member slightly decreases by a backlash of a moving mechanism or the like and eventually does not vary any longer as shown in FIG. 18.

Due to a correlation between the resistance value of the SMA member and an expansion/contraction amount of the SMA member, there is also a correlation between the resistance value of the SMA member and the displacement of the movable member as described. The position control device used in the shape memory alloy actuator can control the position of the movable member by detecting the resistance value of the SMA member without separately providing a position sensor.

On the other hand, the above movement is described below by way of an instruction value input from an external apparatus (e.g. microcomputer) to the position control device instead of the displacement of the movable member.

At a minimum instruction value Xmin, the resistance value Rs of the SMA member is the maximum resistance value Rmax as shown in FIG. 20 and the drive current Is is the minimum drive current Imin as shown in FIG. 21. As the minimum instruction value Xmin increases, the drive current is controlled by a control circuit such that the resistance value Rs of the SMA member gradually decreases from the maximum resistance value Rmax as shown in FIG. 20 and the drive current Is thereof gradually increases from the minimum drive current Imin as shown in FIG. 21. Eventually, when an instruction value X reaches a maximum instruction value Xmax, the resistance value Rs of the SMA member reaches the minimum resistance value Rmin as shown in FIG. 20.

Here, if there is no limit in the instruction value X generated by the external apparatus, the instruction value X beyond the maximum instruction value is input to the position control device. There may also be a case where the maximum instruction value Xmax is exceeded due to a trouble in the position control device or the like.

In such a case, if the maximum instruction value Xmax is exceeded, the position control device tries to execute a control with a resistance value smaller than the minimum resistance value Rmin of the SMA member as a target. As a result, the resistance value Rs of the SMA member becomes smaller than the minimum resistance value Rmin as shown in FIG. 20, but eventually reaches a minimum limit and does not vary any longer. The drive current Is reaches a maximum drive current Imax as shown in FIG. 21.

Such a movement is as shown in FIG. 22 when being expressed in a relationship between the instruction value X and the displacement P of the movable member. Specifically, the displacement P of the movable member is the minimum displacement Pmin at the minimum instruction value Xmin, increases as the instruction value X increases and is the maximum displacement Pmax at the maximum instruction value Xmin. Thereafter, even if the instruction value X exceeds the maximum instruction value Xmax, the displacement P of the movable member does not vary beyond the maximum displacement Pmax.

As described above, there are cases where there is no limit in the instruction value X generated by the external apparatus and the maximum instruction value Xmax is exceeded due to a trouble in the position control device or the like and, in these cases, the SMA member continues to be current-heated through application of the maximum drive current Imax and the properties of the SMA member are degraded. As a result, the performance of the shape memory alloy actuator is reduced. Thus, the position control device of the shape memory alloy actuator requires a protection function of protecting the SMA member from overheating.

For example, in an actuator utilizing a shape memory alloy disclosed in patent literature 1, a limit determiner and a limit controller are provided, whether or not a predetermined limit condition is satisfied is determined so that a wire member made of a shape memory alloy does not exceed a temperature limit below which the wire member normally operates, and the limit controller executes such a control as to stop current application to the wire member so that the shape memory alloy of the wire member is not overheated if it is determined that the limit condition is satisfied as a result of determination. There are cited two determination methods for determining whether or not the limit condition is satisfied. According to a first determination method, it is determined that the limit condition is satisfied if an amount of power supplied to the wire member reaches a predetermined limit value. A supplied power amount to the wire member is calculated from a current application time to the wire member. According to a second determination method, it is determined that the limit condition is satisfied if a difference between or a ratio of a control value and a predetermined reference value exceeds a predetermined value, wherein temperature is cited as the control value.

Here, according to the control methods disclosed in patent literature 1, the shape memory alloy wire member remains its shape when current application is stopped and the position of the movable member driven by the expansion/contraction of the shape memory alloy wire member remains to be the one when current application is stopped if current application to the wire member made of the shape memory alloy is stopped when the limit condition is satisfied. This results in a position control malfunction of the movable member. Thus, if the limit condition is satisfied, it requires a so-called abnormality processing (error handling) such as notification, for example, from the actuator (drive device) to a user to the effect that the limit condition has been satisfied (abnormal state, error state), thereby prompting the user to handle it or recovery of the position control and redoing of initialization by the actuator.

If such an abnormality processing is handled in the drive device or the position control device of the drive device, a system design of the drive device or position control device becomes complicated. Further, an abnormality processing time, for example, for a control stop, a restart, an operation of controlling the position again and the like is necessary, thereby causing time loss. On the other hand, if the position control is simply restarted without handling the abnormality processing in these devices, the devices operate in a similar manner, with the result that there is a high possibility of entering an abnormal state again and executing no position control to a desired position.

PRIOR ART LITERATURE

Patent Literature

Patent Literature 1:
Japanese Unexamined Patent Publication No. 2006-183564

SUMMARY OF THE INVENTION

Problems the Invention Seeks to Solve

The present invention was developed in view of the above situation and an object thereof is to provide a position control device, a position control method, a drive device and an imaging device capable of protecting a shape memory alloy without stopping a position control.

A position control device and a position control method according to the present invention are a technology used in a shape memory alloy actuator for moving a movable member using a shape memory alloy member. In controlling the position of the movable member, an instruction value indicating a position of the movable member as a control target is changed to reduce the temperature of the shape memory alloy member when an amount of power supplied to the shape memory alloy member is in excess of a predetermined first threshold value. A drive device and an imaging device of the present invention include a shape memory alloy actuator and this position control device. Thus, in such position control device, position control method, drive device and imaging device, the position of the movable member is controlled by changing the instruction value to reduce the temperature of the shape memory alloy member even if such an instruction value that the amount of power supplied to the shape memory alloy member will exceed the first threshold value and the shape memory alloy member will be overheated continues to be input, for example, from an external apparatus. For example, the position of the movable member continues to be controlled using such an instruction value as to maintain power supply while reducing the temperature of the shape memory alloy member. Therefore, the position control device, position control method, drive device and imaging device constructed as above can protect a shape memory alloy without stopping a position control.

The above and other objects, features and advantages of the present invention will become apparent from the following detailed description and accompanying drawings.

MODES FOR CARRYING OUT THE INVENTION

Figure 1:
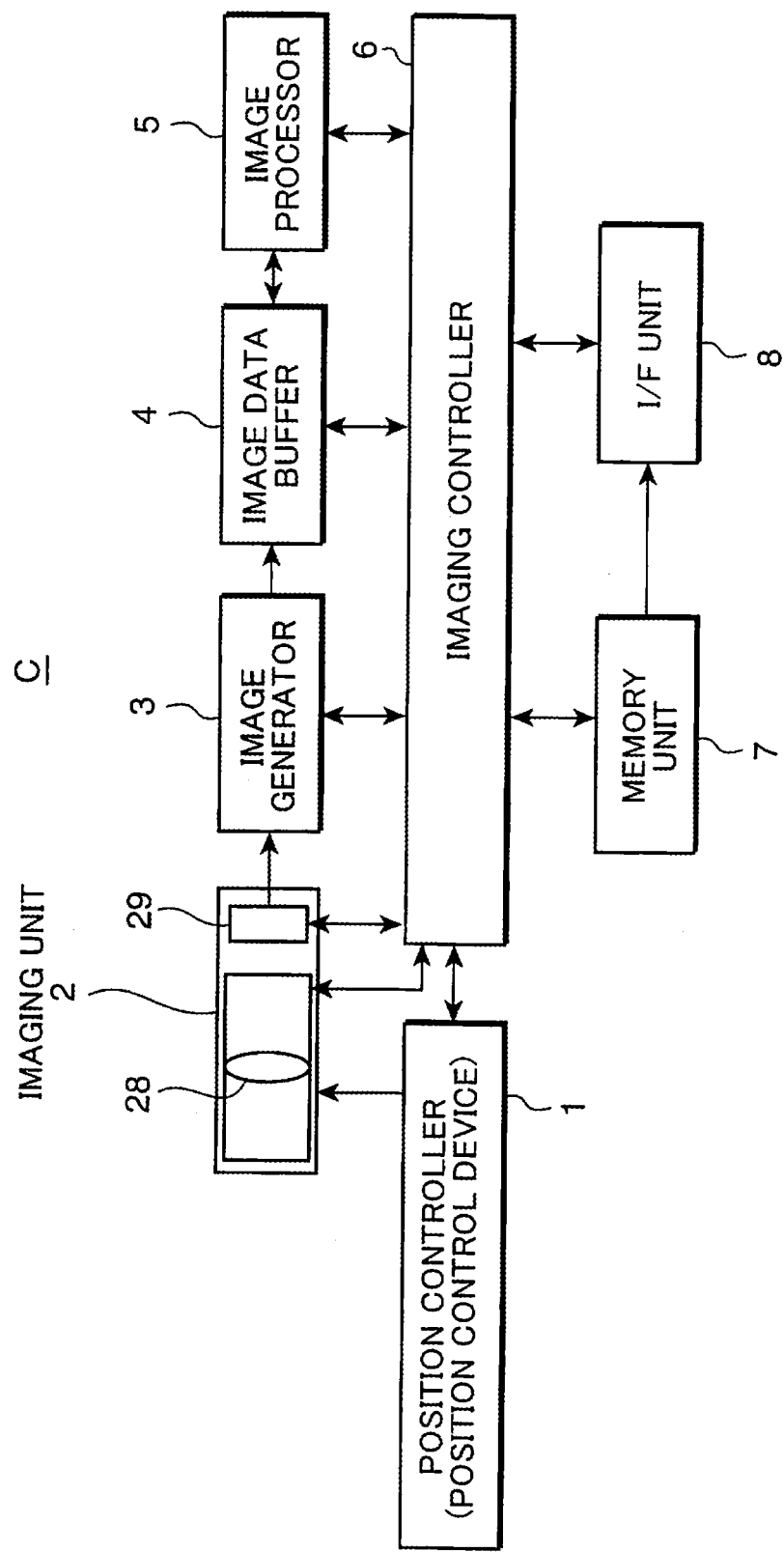
FIG. 1 is a block diagram showing a construction of an imaging device according to one embodiment of the invention.

Hereinafter, embodiments according to the present invention are described with reference to the drawings. Constructions denoted by the same reference numerals in the respective drawings are identical constructions and not repeatedly described if not necessary.

First Embodiment

In this embodiment, a case where a position control device and a drive device according to the present invention are applied to an imaging device is described below. However, the position control device and drive device according to the present invention are not limited to their application to imaging devices, and they may be singly applied or may be applied to other apparatuses. Particularly, it is preferable to utilize them in an apparatus suitable for characteristics of a shape memory alloy actuator. One characteristic of the shape memory alloy actuator is that it is quiet during operation and a relatively large torque can be obtained for its size. Thus, it is preferable to apply the shape memory alloy actuator to a relatively small imaging device incorporated into a mobile terminal such as a mobile phone and to use for the driving of an optical system of the imaging device. With these in mind, the position control device and drive device applied to the imaging device are described below in this embodiment.

Figure 2:
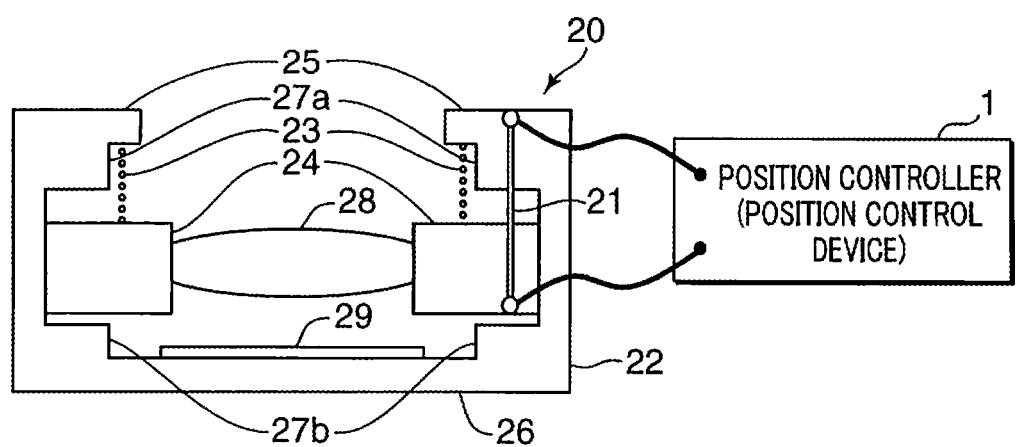
FIG. 2 is a partial sectional view showing a structure of an imaging unit in the imaging device shown in FIG. 1, FIG. 3 are diagrams showing a relationship between a state of a shape memory alloy in the imaging unit structured as shown in FIG. 2 and a position of a movable member.
Figure 3A:
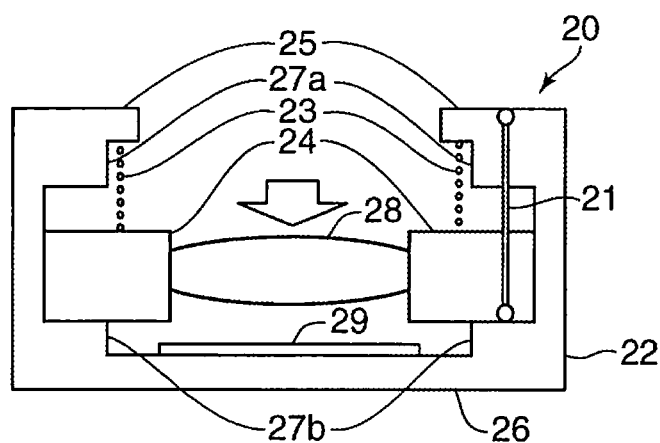
Figure 3B:
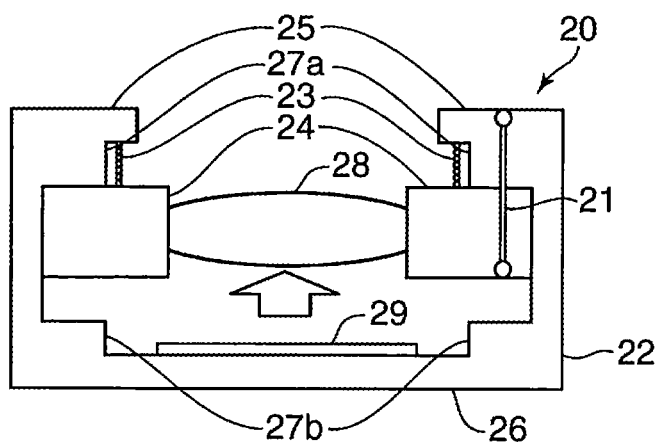

FIG. 1 is a block diagram showing a construction of the imaging device according to the embodiment. FIG. 2 is a partial sectional view showing a structure of an imaging unit in the imaging device according to the embodiment. FIG. 3 are diagrams showing a relationship between a state of a shape memory alloy in the imaging unit structured as shown in FIG. 2 and a position of a movable member. FIG. 3A shows a case where a lens attached to the movable member is positioned at a beyond-infinite limit and FIG. 3B shows a case where the lens attached to the movable member is at a most proximal limit.

An imaging device C includes a shape memory alloy actuator (hereinafter, abbreviated as "SMA actuator") for moving the movable member using a shape memory alloy member (hereinafter, abbreviated as "SMA member") by a bias applying method, a lens which moves according to a movement of the movable member, an imaging element for imaging an optical image of a subject focused by an imaging optical system including the lens, and a position control device for controlling the position of the movable member.

Such an imaging device C includes a position controller 1, an imaging unit 2, an image generator 3, an image data buffer 4, an image processor 5, an imaging controller 6, a memory unit 7 and an I/F unit 8.

The position controller 1 is an example of the position control device, used in an SMA actuator 20 for moving a movable member 24 using an SMA member 21 by a bias applying method, and controls the position of the movable member 24 based on a control signal Sc output from the imaging controller 6. The position controller 1 is described in more detail later.

The imaging unit 2 is a device for imaging an optical image of a subject focused by the imaging optical system, and outputs an image signal obtained by an imaging operation to the image generator 3. The imaging unit 2 includes, for example, the SMA actuator 20, a lens 28 which moves in an optical axis direction according to a movement of the movable member 24, and an imaging element 29 for imaging an optical image of a subject focused by the lens 28 constituting the imaging optical system as shown in FIG. 2.

The SMA actuator 20 includes the SMA member 21, a fixed member 22, a biasing member 23 and the movable member 24.

The SMA member 21 is made of an SMA which remembers a predetermined shape and applies a drive force to the movable member 24 by being heated. The SMA is, for example, a Ni—Ti alloy, a Cu—Al—Ni alloy, a Cu—Zn alloy, a Cu—Zn—Al alloy, Ni—Al alloy or the like. Ni—Ti alloys are excellent in strength, toughness, corrosion resistance and abrasion resistance and suitable for the SMA member 21. The SMA member 21 is, for example, a wire member (wire-like body) having a substantially circular cross section, and one end thereof is fixed to the fixed member 22 at a first predetermined position and the other end thereof is fixed to the movable member 24 at a second predetermined position. The opposite ends of the SMA member 21 are connected to the position controller 1 by a pair of conductive wires. The SMA member 21 generates Joule heat by its own resistance to be heated (current heating), for example, when power is supplied from the position controller 1 via the pair of conductive wires to energize the SMA member 21. The SMA member 21 memorizes, for example, its shape with a predetermined length beforehand and returns to the memory shape memorized beforehand when a transformation temperature is reached.

The fixed member 22 is a member for fixing the one end of the SMA member 21. By having the one end fixed to the fixed member 22, the SMA member 21 expands and contracts, with the fixed one end being a reference end in expansion and contraction and the other end thereof is displaced (moved). As a result, the movable member 24 is moved according to the expansion and contraction of the SMA member 21 since the movable member 24 is fixed to the other end of the SMA member 21. The fixed member 22 is in the form of a lens barrel since the SMA actuator 20 is applied to the imaging unit 2 in this embodiment. More specifically, in order to function as a lens barrel, the fixed member 22 is a member having substantially the shape of a cylinder, includes an extending portion 25 radially extending toward a center substantially perpendicularly to a surface of one end of the cylinder and having an annular (doughnut-shaped) plan view and a disk-shaped lid member 26 which closes the other end of the cylinder. Further, an upper restricting member 27a and a lower restricting member 27b are arranged on the inner side surface of the cylinder while being vertically spaced by a specified distance in a longitudinal direction. The one end of the SMA member 21 is fixed at the first predetermined position at the inner side of the extending portion 25. The imaging element 29 is arranged on the inner side of the lid member 26.

The biasing member 23 is a member for applying a biasing force (bias) to the movable member 24 against a drive force of the SMA member 21. The biasing member 23 is, for example, composed of an elastic body such as a coil spring (e.g. compression coil spring). One end of the biasing member 23 is held in contact with the fixed member 22 to fix the biasing member 23. More specifically, the one end of the biasing member 23 is held in contact with the inner side of the extending portion 25 of the fixed member 22. Accordingly, the fixed member 22 is also a member for fixing the one end of the biasing member 23. The other end of the biasing member 23 is held in contact with the movable member 24 to transmit the biasing force to the movable member 24. The biasing member 23 functions as a biasing spring of the shape memory alloy actuator 20.

The movable member 24 is a member which moves according to the drive force of the SMA member 21 and the biasing force of the biasing member 23. The movable member 24 is used to move the lens 28 and constitutes a lens frame for holding (supporting) the lens 28 since the position controller 1 and the drive device are applied to the imaging device C in this embodiment. More specifically, the movable member 24 has an annular shape to hold (support) the lens 28 at its outer peripheral part, and the lens 28 is fitted in a circular opening defined by the annular shape. The movable member 24 is so arranged inside the substantially cylindrical fixed member 22 as to slide on the inner side of the substantially cylindrical fixed member 22. The movable member 24 is arranged between the upper and lower restricting members 27a, 27b, and a movable range thereof is restricted by the upper and lower restricting members 27a, 27b.

In the SMA actuator 20 constructed as above, when the temperature of the SMA actuator 21 is lower than the transformation temperature and a crystal structure thereof is a martensite phase, the SMA actuator 21 is expanded by the biasing force of the biasing member 23 (force acting in a direction from the extending portion 25 to the lid member 26) and the movable member 24 moves in a direction toward the lid member 26 while sliding on the inner side of the substantially cylindrical fixed member 22 and eventually comes into contact with the lower restricting member 27b as shown in FIG. 3A. A displacement P of the movable member 24 in this case is defined to be a minimum displacement Pmin. The lens 28 moves according to this movement of the movable member 24 and is located at a beyond-infinite limit focus position when the movable member 24 stops. On the other hand, when the SMA member 21 is current-heated to reach the transformation temperature or higher, the crystal structure thereof changes to the austenite phase and the SMA member 21 contracts to return to the memory shape. By the contraction of the SMA member 21 is produced a drive force in a direction against the biasing force of the biasing member 23 (force in a direction from the lid member 26 toward the extending portion 25). The drive force and the biasing force act in opposite directions, and the SMA member 21 and the biasing member 23 are arranged in the fixed member 22 so that such drive force and biasing force are produced. By this drive force of the SMA member 21, the movable member 24 moves in the direction toward the extending portion 25 while sliding on the inner side of the substantially cylindrical fixed member 22, and eventually comes into contact with the upper restricting member 27a to stop. The displacement P of the movable member 24 in this case is defined to be a maximum displacement Pmax. The lens 28 moves according to this movement of the movable member 24 and is located at a most proximal limit focus position when the movable member 24 stops. When power application to the SMA member 21 is suppressed or stopped, the temperature of the SMA member 21 falls below the transformation temperature due to natural heat release and starts expanding again from the memory shape by the biasing force of the biasing member 23. The SMA actuator 20 operates as described above.

In the example shown in FIG. 2, the biasing member 23 is a compression coil spring since being arranged between the extending portion 25 of the fixed member 22 and the movable member 24. However, the biasing member 23 may be a tensile coil spring arranged between the lid member 26 of the fixed member 22 and the movable member 24.

The lens 28 is the imaging optical system for focusing an optical image of a subject on a light receiving surface of the imaging element 29. Although one lens 28 is provided in this embodiment, a plurality of lenses may be provided. Light from a subject introduced into the lens barrel through an opening defined by the annular shape of the extending portion 25 is focused on the light receiving surface of the imaging element 29 by the lens 28 as the imaging optical system, thereby forming an optical image of the subject on the light receiving surface of the imaging element 29, and this optical image of the subject is imaged by the imaging element.

The imaging element 29 converts the optical image of the subject focused by the lens 28 into electrical signals (image signals) of respective color components R, G and B, and outputs the image signals of the respective components R, G and B to the image generator 3. The imaging controller 6 controls an imaging operation of the imaging element 29 such as imaging of a still image or moving images or readout (horizontal synchronization, vertical synchronization, transfer) of output signals from respective pixels in the imaging element 29.

The image generator 3 performs an amplification processing, a digital conversion processing, etc. on the analog output signals from the imaging element 29 and also performs known image processings such as determination of a proper black level, a γ correction, a white balance adjustment (WB adjustment), an outline correction and a color unevenness correction for the entire image, thereby generating image data of the respective pixels from the image signals. The image data generated by the image generator 3 are output to the image data buffer 4. The image data buffer 4 is a memory for temporarily storing the image data and used as a work area where the image processings are performed on the image data by the image processor 5, and is, for example, composed of a RAM (Random Access Memory) or the like that is a volatile memory element. The image processor 5 is a circuit for performing image processings such as resolution conversion on the image data in the image data buffer 4. The imaging controller 6 includes, for example, a microcomputer and its peripheral circuits, and controls the operations of the position controller 1, the imaging unit 2, the image generator 3, the image data buffer 4, the image processor 5, the memory unit 7 and the IT unit 8 according to their functions. In other words, the imaging device C is so controlled by this imaging controller 6 as to photograph at least either a still image or moving images of a subject. The memory unit 7 is a memory circuit for storing image data generated by still image photographing or moving image photographing of a subject. In other words, the memory unit 7 has a function as a memory for still images and moving images. The memory unit 7 is, for example, composed of a ROM (Read Only Memory) which is a nonvolatile memory element, an EEPROM (Electrically Erasable Programmable Read Only memory) which is a rewritable nonvolatile memory element, a RAM or the like. The I/F unit 8 is an interface for transmitting and receiving image data to and from external apparatuses, e.g. an interface complying with a standard such as USB or IEEE1394.

In the imaging device C constructed as above, in the case of still image photographing, the imaging controller 6 controls the imaging unit 2, the image generator 3, the image data buffer 4 and the image processor 5 to photograph a still image, and the position controller 1 controls the position of the movable member 24 (lens 28) for focusing. In this way, an image of a subject is displayed on an unillustrated display. A photographer presses an unillustrated so-called shutter button while referring to the display, whereby image data are stored in the memory unit 7 as the memory for still images to obtain the still image. On the other hand, in the case of moving image photographing, the imaging controller 6 controls the imaging unit 2, the image generator 3, the image data buffer 4 and the image processor 5 to photograph moving images and the position controller 1 controls the position of the movable member 24 (lens 28) for focusing. The photographer presses the shutter button while referring to the display, whereby moving image photographing is started at a predetermined frame rate in the imaging device C. By pressing the shutter button again, the moving image photographing is finished. The photographed moving images are stored in the memory unit 7 as the memory for moving images.

Figure 4:
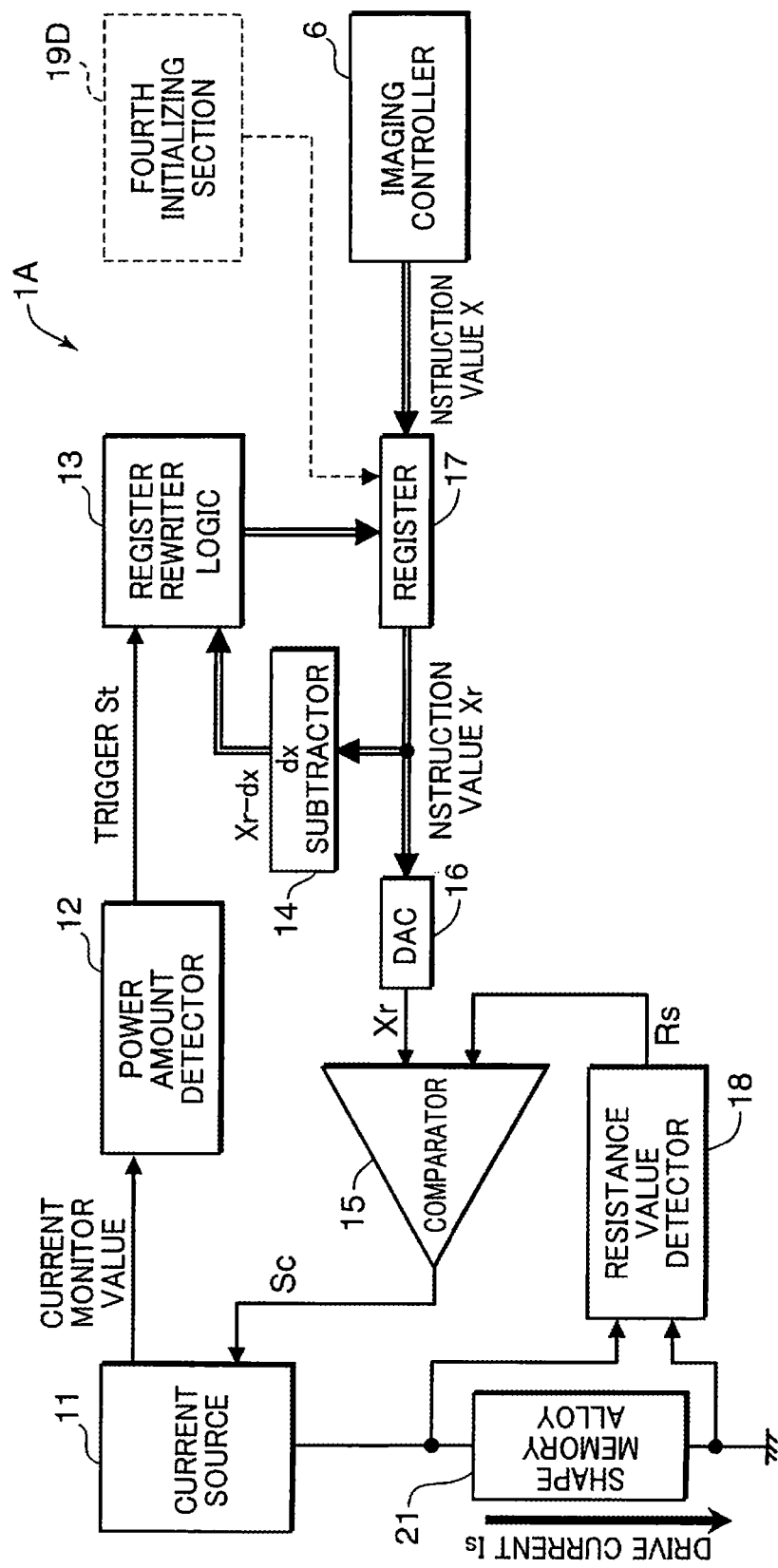
FIG. 4 is a block diagram showing a construction of a position control device according to a first embodiment of the invention.

The position controller 1 for controlling the position of the movable member 24 is further described below. FIG. 4 is a block diagram showing a construction of a position control device according to a first embodiment. A position control device 1A according to the first embodiment as the position controller 1 includes a control unit for controlling the position of the movable member 24 according to an instruction value indicating a position of the movable member 24 as a control target, a detector unit for detecting an amount of power supplied to the SMA member 21 and determining whether or not the detected power amount is in excess of a first threshold value set beforehand, and a changer unit for changing the instruction value to reduce the temperature of the SMA member 21 if the power amount is determined to be in excess of the first threshold value in the detector unit. In this embodiment, the control unit includes a first holding section for holding the instruction value and a first controller for controlling the position of the movable member according to the instruction value held in the first holding section. The changer unit includes a first calculator for calculating a change instruction value by changing the instruction value to reduce the temperature of the SMA member 21, and a first rewriter for rewriting the instruction value held in the first holding section into the change instruction value calculated in the first calculator.

More specifically, as shown in FIG. 4, the position control device 1A includes a current source 11, a power amount detector 12, a register rewriter 13, a dx subtractor 14, a comparator 15, a digital-to-analog converter (hereinafter, abbreviated as "DAC") 16, a register 17 and a resistance value detector 18.

The current source 11 is a circuit for supplying a current to the SMA member 21 to heat the SMA member 21 by application of a current. A current value Is supplied to the SMA member 21 is controlled based a difference between both inputs to the comparator 15 by a control signal Sc input from the comparator 15. The current source 11 outputs a current monitor value corresponding to the current value Is supplied to the SMA member 21 to the power amount detector 12.

The resistance value detector 18 is a circuit for detecting a resistance value Rs of the SMA member 21 by detecting voltage values Vs at the opposite ends of the SMA member 21 and the current value Is of the current flowing in the SMA member 21 from the current monitor value. This detected resistance value Rs of the SMA member 21 is output from the resistance value detector 18 to the comparator 15.

The comparator 15 is a circuit for comparing an instruction value Xr input from the DAC 16 and the resistance value Rs input from the resistance value detector 18 and outputting a control signal Sc corresponding to a difference between the instruction value Xr and the resistance value Rs to the current source 11.

These current source 11, resistance value detector 18 and comparator 15 perform a so-called feedback control to control the resistance value Rs of the SMA member 21 so that the resistance value Rs of the SMA member 21 becomes a value corresponding to the instruction value Xr. By controlling the resistance value Rs of the SMA member 21, the displacement of the SMA member 21 (length of the SMA member 21) is controlled, thereby controlling the position of the movable member 24 (lens 28).

The register 17 is a circuit for holding (storing) the instruction value X input from the imaging controller 6 and, for example, composed of a plurality of flip-flop circuits and the like. The instruction value X held in the register 17 is output as the instruction value Xr from the register 17 to the DAC 16 and the dx subtractor 14. Here, an output of the register 17 is expressed as the instruction value Xr because the value held in the register 17 is different from the instruction value X input from the imaging controller 6 in specified cases.

The instruction value X is, in order to move the movable member 24 (i.e. lens 28) to a predetermined position, the resistance value Rs of the SMA member 21 corresponding to the displacement of the SMA member 21 (length of the SMA member 21) when the movable member 24 (lens 28) is at the predetermined position. The predetermined position is a focus position of the lens 28 because of application to the imaging device C in this embodiment. A relationship between the position of the movable member 24 (lens 28) and the resistance value Rs of the SMA member 21 is stored in the imaging controller 6, for example, in the form of a mathematical formula, a table or the like. Alternatively, a relationship between the position of the movable member 24 (lens 28) and the displacement (length) of the SMA member 21 and that between the displacement (length) of the SMA 21 and the resistance value Rs of the SMA member 21 are stored in the imaging controller 6.

The DAC 16 is a circuit for converting the instruction value Xr input from the register 17 from a digital value into an analog value. The converted instruction value Xr in the form of the analog value is output from the DAC 16 to the comparator 15 as described above.

Here, the control unit includes the current source 11, the comparator 15, the DAC 16, the resistance value detector 18 and the register 17 as one construction example, the first holding section includes the register 17 as one construction example, and the first controller includes the current source 11, the DAC 16, the comparator 15 and the resistance value detector 18 as one construction example.

The dx subtractor 14 is a circuit for subtracting a predetermined value dx set beforehand from the instruction value Xr input from the register 17. This difference value (Xr−dx) is output from the dx subtractor 14 to the register rewriter 13.

The power amount detector 12 is one construction example of the detector unit and is a circuit for monitoring the amount of power supplied to the SMA member 21 based on the current monitor value input from the current source 11 and, when the amount of power supplied to the SMA member 21 satisfies a predetermined condition set beforehand, outputting a trigger signal St indicating this to the register rewriter 13. Whether or not the SMA member 21 is overheated is monitored by monitoring the amount of power supplied to the SMA member 21. The predetermined condition is whether or not the amount of power supplied from the current source 11 to the SMA member 21 is in excess of a first power threshold value Wth1, and the power amount detector 12 determines that the predetermined condition is satisfied and outputs the trigger signal St to the register rewriter 13 when the amount of power supplied from the current source 11 to the SMA member 21 is in excess of the first power threshold value Wth1, whereas it determines that the predetermined condition is not satisfied and outputs no trigger signal St to the register rewriter 13 when the amount of power supplied from the current source 11 to the SMA member 21 is equal to or below the first power threshold value Wth1. In this embodiment, the current monitor value corresponding to the current value Is from the current source 11 to the SMA member 21 is input to the power amount detector 12. Thus, the predetermined condition is, in this embodiment, whether or not the current value Is input from the current source 11 is in excess of a current threshold value Ith set beforehand and its duration Ts is in excess of a time threshold value Tth. The power amount detector 12 determines that the predetermined condition is satisfied and outputs the trigger signal St to the register rewriter 13 when the current value Is input from the current source 11 is in excess of the current threshold value Ith and its duration Ts is in excess of the time threshold value Tth.

A voltage value detector for detecting a voltage to be applied to the SMA member 21 may be further provided, and the power amount detector 12 may use a voltage value Vs (or its monitor value) input from this voltage value detector instead of the current monitor value. In this case, the predetermined condition is, in this embodiment, whether or not the voltage value Vs is in excess of a voltage threshold value Vth set beforehand and its duration Ts is in excess of a time threshold value Tvth. The power amount detector 12 determines that the predetermined condition is satisfied and outputs the trigger signal St to the register rewriter 13 when the voltage value Vs is in excess of the voltage threshold value Vth and its duration Ts is in excess of the time threshold value Tvth. Alternatively, the voltage value Vs may be used in addition to the current value Is. In this case, the amount of power supplied to the SMA member 21 can be directly calculated by multiplying the current value Is, the voltage value Vs and the duration Ts.

The register rewriter 13 rewrites the content held in the register 17 into the value (Xr−dx) input from the dx subtractor 14 when the trigger signal St is input from the power amount detector 12. In other words, the register 17 will hold (Xr−ndx) by n rewriting operations of the register rewriter 13 (n=1, 2, 3, . . . ).

Here, the changer unit includes the dx subtractor 14 and the register rewriter 13 as one construction example, the first calculator includes the dx subtractor 14 as one construction example, and the rewriter includes the register rewriter 13 as one construction example.

Figure 5:
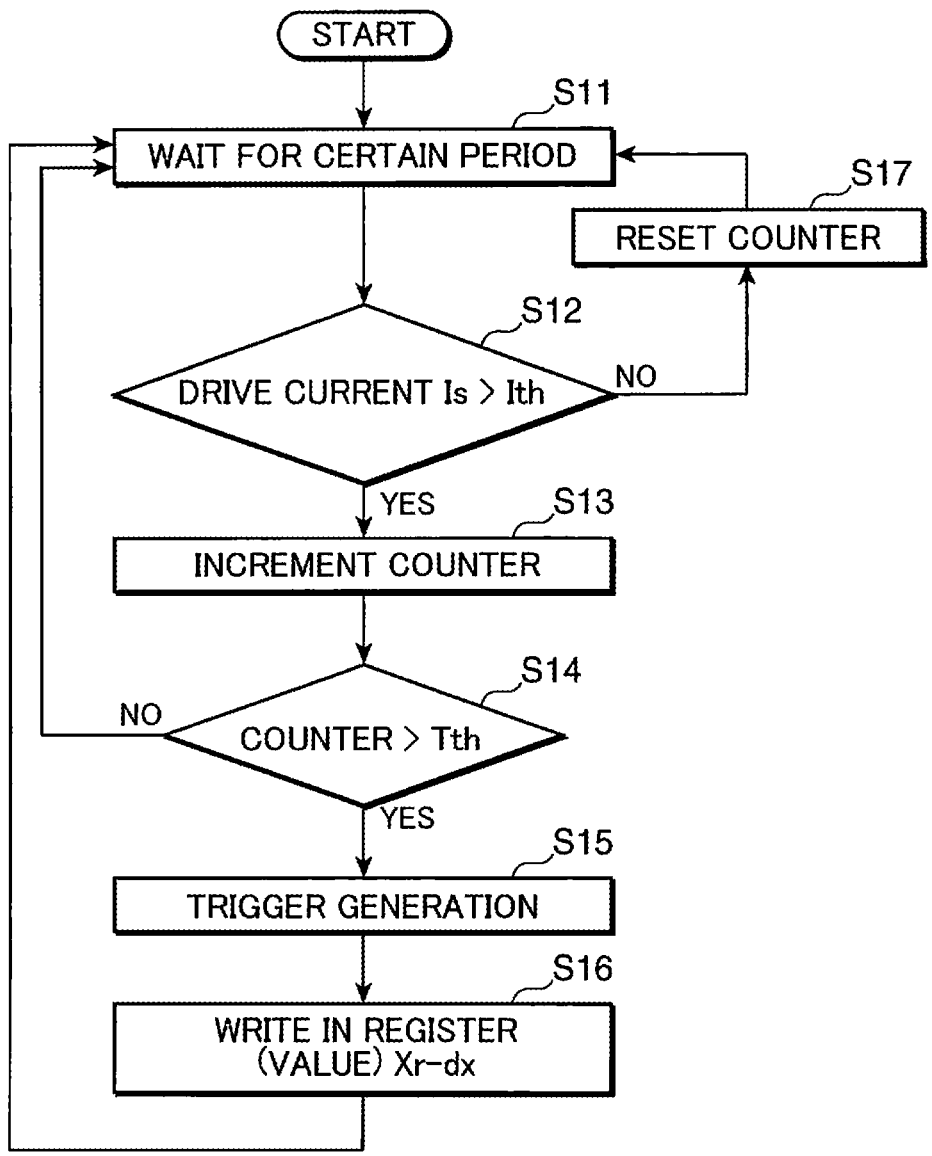
FIG. 5 is a flow chart showing an operation of the position control device shown in FIG. 4.

The operation of the position control device 1A constructed as described above is described below. FIG. 5 is a flow chart showing an operation of the position control device according to the first embodiment.

In the imaging device C, its operation is started and an instruction value X indicating a position of the lens 28 (position of the movable member 24) to be driven is output from the imaging controller 6 to the register 17 to be held therein, for example, for focusing of the lens 28. This instruction value X is output as an instruction value Xr from the register 17 to the dx subtractor 14 and the DAC 16. In the dx subtractor 14, the predetermined value dx is subtracted from this instruction value Xr, and this subtraction result (Xr−dx) is output to the register rewriter 13. On the other hand, in the DAC 16, the instruction value Xr is converted from a digital value into an analog value, and the instruction value Xr in the form of the analog value is output to the comparator 15. The resistance value Rs of the SMA member 21 detected by the resistance value detector 18 is input from the resistance value detector 18 to the comparator 15. In the comparator 15, the instruction value Xr from the DAC 16 and the resistance value Rs from the resistance value detector 18 are compared, and a control signal Sc corresponding to a difference between the two values is output from the comparator 15 to the current source 11. In the current source 11, the current value Is supplied to the SMA member 21 is controlled by this control signal Sc and output to the power amount detector 12.

In FIG. 5, in Step S11, a processing operation is forced to wait for a certain period of time (processing standby) in the power amount detector 12. Subsequently, in Step S12, whether or not the current value Is input from the current source 11 is larger than the current threshold value Ith is determined based on the current monitor value in the power amount detector 12. As a result of determination, unless the current value Is is in excess of the current threshold value Ith (NO), Step S17 is performed to reset a counter and this routine returns to Step S11. On the other hand, if the current value Is is in excess of the current threshold value Ith (YES) as a result of determination, Step S13 is performed to increment the counter. This counter is a variable for counting the duration Ts during which the current value Is input from the current source 11 is larger than the current threshold value Ith.

Subsequently, in Step S14, whether or not the counter has counted in excess of the time threshold value Tth is determined in the power amount detector 12. If the counter has not counted in excess of the time threshold value Tth (NO) as a result of determination, the routine returns to Step S11. On the other hand, if the counter has counted in excess of the time threshold value Tth (YES) as a result of determination, Step S15 is performed to generate a trigger signal St, which is output from the power amount detector 12 to the register rewriter 13.

Subsequently, in Step S16, when the register rewriter 13 receives this trigger signal St, the content held in the register 17 is rewritten into the value (Xr−dx) input from the dx subtractor 14. In this way, the value (Xr−dx) smaller than the instruction value Xr by the predetermined value dx is input as a new instruction value Xr to the comparator 15 via the DAC 16. Thus, the current value Is supplied from the current source 11 to the SMA member 21 is reduced.

Subsequently, when the processing in Step S16 is performed, the routine returns to Step S11. Thus, if the current value Is supplied from the current source 11 to the SMA member 21 is still in excess of the current threshold value Ith even if the instruction value Xr is reduced by the predetermined value dx, a value (Xr−2dx) smaller than the instruction value (Xr−dx) by the predetermined value dx is input as a new instruction value Xr via the DAC 16 by performing the above processings of Steps S11 to S16. In this way, if the current value Is supplied from the current source 11 to the SMA member 21 is in excess of the current threshold value Ith, the instruction value Xr is successively reduced by the predetermined value dx. Thus, there is no likelihood of continuing to supply an overcurrent to the SMA member 21, thereby protecting the SMA member 21 from the supply of the overcurrent. The predetermined value dx is an amount by which the instruction value Xr is reduced each time.

When a new instruction value X is input from the imaging controller 6 while such a protection function is working, the position control device 1A is operated as described above based on this new instruction value X. If a current value Is corresponding to this new instruction value X is not in excess of the current threshold value Ith, the position control device 1A continues to normally perform a position control operation. Therefore, the position control device 1A according to the first embodiment can protect the SMA member 21 without stopping a position control even if an overcurrent is supplied to the SMA member 21 and the predetermined condition is satisfied.

The operation of the position control device 1A is more specifically described below by way of a specific example.

Figure 6:
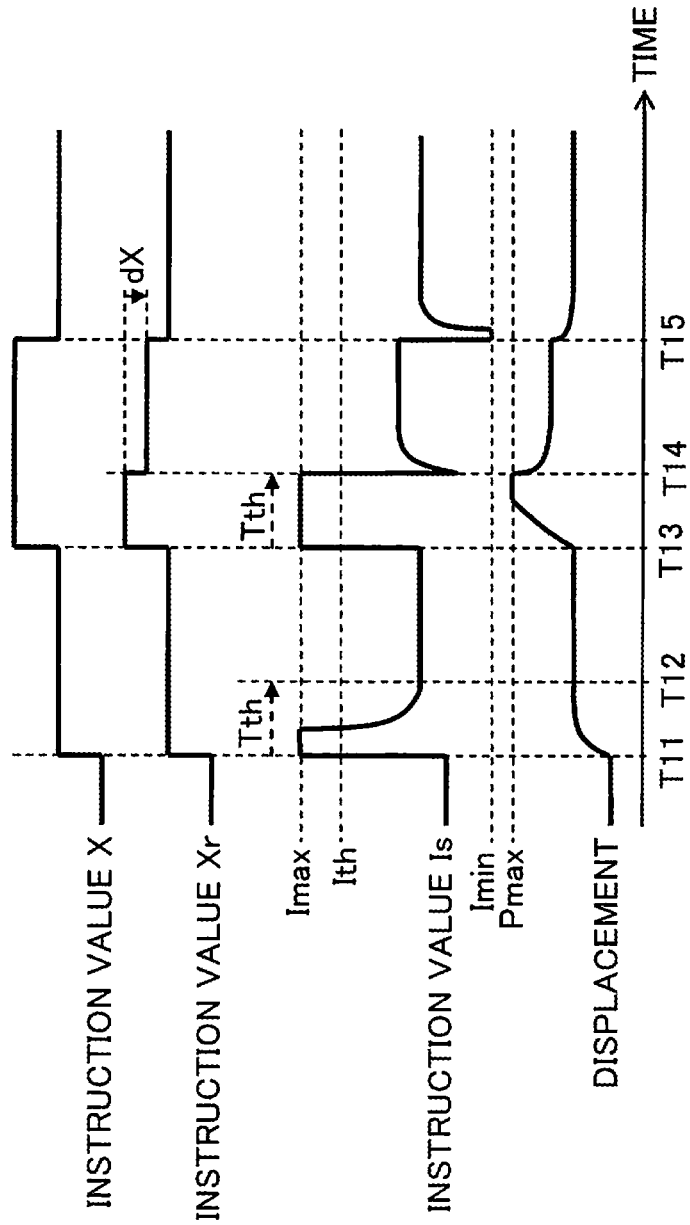
FIG. 6 is a time chart showing an example of the operation of the position control device shown in FIG. 4.

FIG. 6 is a time chart showing an example of the operation of the position control device according to the first embodiment. FIG. 6 shows respective time charts of the instruction value X, the instruction value Xr, the drive current Is of the SMA member 21 and the displacement of the movable member 24 in this order from above, wherein a horizontal axis is a time axis indicating lapsed time.

For example, when an instruction value X=Xr is input from the imaging controller 6 to the register 17 at time T11 as shown in FIG. 6, the position control device 1A operates as described above and an instruction value Xr=Xra corresponding to the instruction value X=Xa is input from the DAC 16 to the comparator 15. Since the instruction value Xra and the resistance value Rs of the SMA member 21 detected by the resistance value detector 18 largely differ in this example, a relatively large current value Is, here a maximum current value Imax of the current source 11, is supplied from the current source 11 to the SMA member 21. Upon receiving the supply of this maximum current value Imax, the SMA member 21 returns (contracts) to the memory shape by current heating and the movable member 24 (lens 28) is displaced toward a control target so as to move to a desired position. During this time, the current value Imax is in excess of the current threshold value Ith. Thus, Steps S11 to S16 shown in FIG. 5 are repeatedly performed at regular time intervals and the counter is incremented. When the movable member 24 approaches the control target, the resistance value Rs of the SMA member 21 approaches the instruction value Xra in this example, with the result that the current Is supplied from the current source 11 to the SMA member 21 decreases from the maximum current value Imax and falls to or below the current threshold value Ith. Thus, the routine returns to Step S11 from Step S14 shown in FIG. 5, thereby ending counting-up of the counter. Then, the movable member 24 (lens 28) is moved to the desired position at time T12.

On the other hand, when an instruction value X=Xb (>Xa) is input from the imaging controller 6 to the register 17 at time T13, the position control device 1A operates as described above, and an instruction value Xr=Xrb corresponding to the instruction value X=Xb is input from the DAC 16 to the comparator 15. It is assumed that Steps S11, S12 and S17 shown in FIG. 5 are performed during a period between time T12 and time T13 and the counter is reset. Since the instruction value Xrb and the resistance value Rs of the SMA member 21 detected by the resistance value detector 18 largely differ in this example, a relatively large current value Is, here the maximum current value Imax of the current source 11, is supplied from the current source 11 to the SMA member 21. Upon receiving the supply of this maximum current value Imax, the SMA member 21 returns (contracts) to the memory shape by current heating and the movable member 24 (lens 28) is displaced toward a control target so as to move to a desired position. During this time, the current value Imax is in excess of the current threshold value Ith. Thus, Steps S11 to S14 shown in FIG. 5 are repeatedly performed at regular time intervals and the counter is incremented. In the example shown in FIG. 5, the maximum current value Imax is supplied from the current source 11 to the SMA member 21 even if the movable member 24 comes into contact with the upper restricting member 27a and the displacement of the movable member 24 becomes the maximum value Pmax. Thus, Steps S11 to S14 shown in FIG. 5 are repeatedly performed at regular time intervals, the counter is further incremented and eventually the counter value exceeds the time threshold value Tth. Thus, Step S15 is performed following Step S14, a trigger signal St is output from the power amount detector 12 to the register rewriter 13, and the register rewriter 13 rewrites the register 17 with a value (Xrb−dx). As a result, the value from the DAC 16 to be compared with the resistance value Rs of the SMA member 21 from the resistance value detector 18 in the comparator 15 decreases from the instruction value Xrb to the value (Xrb−dx), the current value Is supplied from the current source 11 to the SMA member 21 decreases from the maximum current value Imax and falls to or below the current threshold value Ith. Thus, the routine returns to Step S11 from Step S14 shown in FIG. 5, thereby ending counting-up of the counter. Then, the SMA member 21 becomes stationary after a displacement corresponding to the value (Xrb−dx) and the movable member 24 (lens 28) stops at a position corresponding to the value (Xrb−dx).

When an instruction value X=Xc (<Xb) is input from the imaging controller 6 to the register 17 at time T15, the position control device 1A starts operating as described above.

As described above, the position control device 1A according to the first embodiment can protect the SMA member 21 without stopping a position control even if an overcurrent is supplied to the SMA member 21 and the predetermined condition is satisfied.

Although the displacement of the SMA member 21 reaches the maximum value Pmax and the maximum current value Imax is supplied from the current source 11 to the SMA member 21 in the above example, a similar operation is performed and the position control device 1A can be used also, for example, in the case where the maximum current value Imax is supplied from the current source 11 to the SMA member 21 due to a change in an operating environment or an increase in drive load.

Next, another embodiment is described.

Second Embodiment

Figure 7:
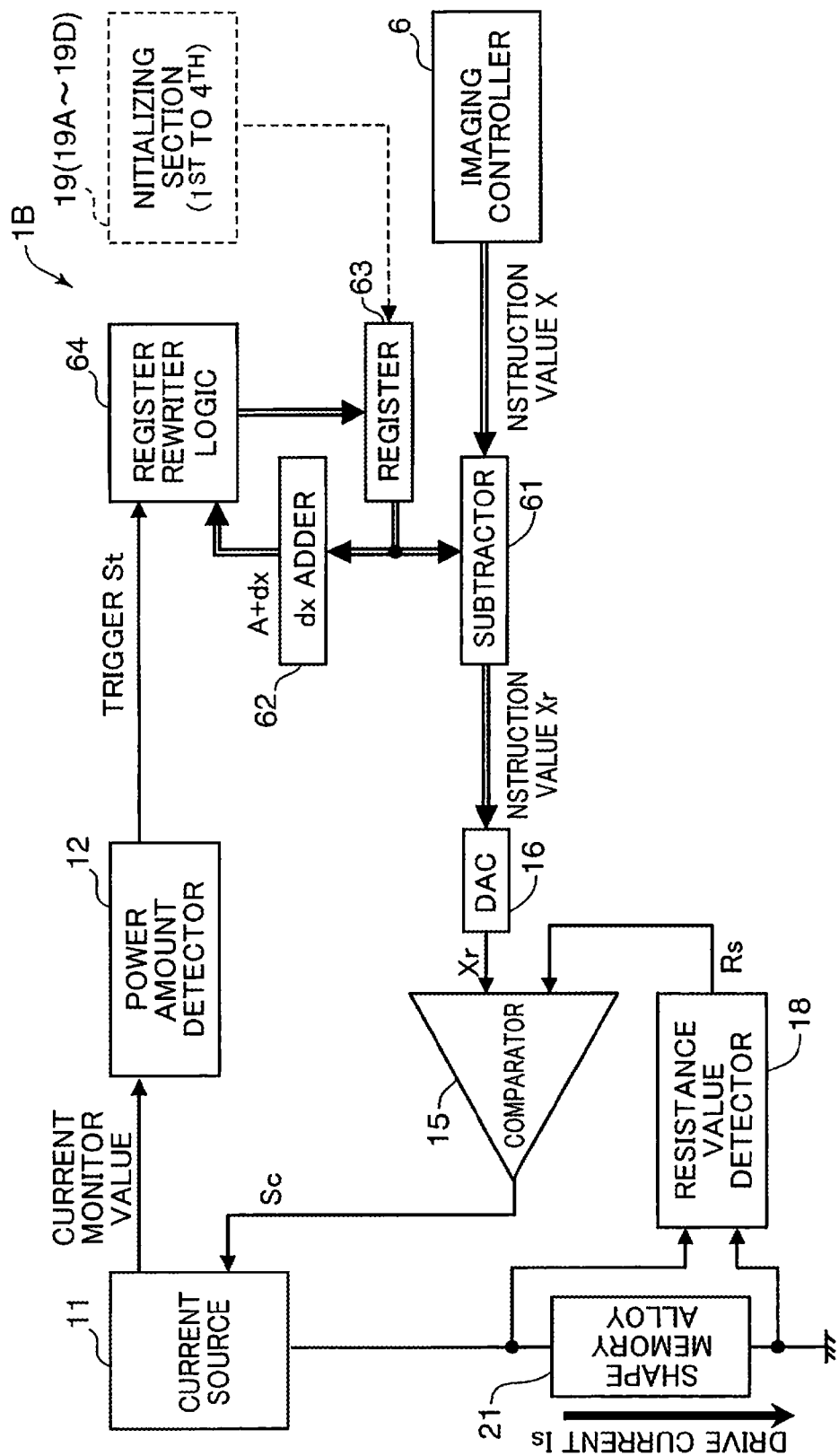
FIG. 7 is a block diagram showing a construction of a position control device according to a second embodiment of the invention.

FIG. 7 is a block diagram showing a construction of a position control device according to a second embodiment. A position control device 1B according to the second embodiment as the position controller 1 includes the control unit, the detector unit and the changer unit and, in this embodiment, the changer unit includes a second holding section for holding an offset value, a second calculator for calculating a change offset value by changing the offset value to reduce the temperature of the SMA member 21, and a second rewriter for rewriting the offset value held in the second holding section into the change offset value calculated in the second calculator when the power amount is determined to be in excess of the threshold value in the detector unit, and the control unit includes an offsetter for offsetting the instruction value using the offset value held in the second holding section, and a second controller for controlling the position of the movable member 24 according to the instruction value offset in the offsetter.

More specifically, as shown in FIG. 7, the position control device 1B includes a current source 11, a power amount detector 12, a subtractor 61, a dx adder 62, a register 63, a register rewriter 64, a comparator 15, a DAC 16 and a resistance value detector 18.

The instruction value Xr is successively reduced by the predetermined value dx by the register 17, the dx subtractor 14 and the register rewriter 13 for overcurrent protection of the SMA member 21 in the position control device 1A according to the first embodiment shown in FIG. 4, whereas an instruction value Xr is successively reduced by a predetermined value dx by the subtractor 61, the dx adder 62, the register 63 and the register rewriter 64 in the position control device 1B according to the second embodiment. Thus, the current source 11, the power amount detector 12, the comparator 15, the DAC 16 and the resistance value detector 18 of the position control device 1B of the second embodiment are respectively similar to the current source 11, the power amount detector 12, the comparator 15, the DAC 16 and the resistance value detector 18 in the position control device 1A of the first embodiment and, hence, are not described.

The register 63 is a circuit for holding (storing) an offset value $A_O$ to be subtracted from an instruction value X input from the imaging controller 6 and is, for example, composed of a plurality of flip-flop circuits and the like. The offset value $A_O$ held in the register 63 is output from the register 63 to the subtractor 61 and the dx adder 62. The offset value $A_O$ held in the register 63 is set at 0 as an initial value at the time of initialization, e.g. start-up of the imaging device C.

The subtractor 61 is a circuit for subtracting the offset value $A_O$ input from the register 63 from the instruction value X input from the imaging controller 6. A difference value $(X-A_O)$ is output as an instruction value Xr to the DAC 16. Here, an output of the subtractor 61 is expressed as the instruction value Xr because the value output from the subtractor 61 is different from the instruction value X input from the imaging controller 6 in specified cases as in the case of the first embodiment.

The dx adder 62 is a circuit for adding the predetermined value dx set beforehand to the offset value $A_O$ input from the register 63. This sum value $(A_O+dx)$ is output from the dx adder 62 to the register rewriter 64.

The register rewriter 64 rewrites the offset value $A_O$ of the register 63 into the value $(A_O+dx)$ input from the dx adder 62 $(A_O \leftarrow A_O+dx)$ when a trigger signal St is input from the power amount detector 12. In other words, the register 63 will hold $(A_O+ndx)$ by n rewriting operations of the register rewriter 64 (n=1, 2, 3, . . . ).

Here, the control unit includes the current source 11, the comparator 15, the DAC 16, the resistance value detector 18 and the subtractor 61 as one construction example, the offsetter includes the subtractor 61 as one construction example, and the second controller includes the current source 11, the DAC 16, the comparator 15 and the resistance value detector 18 as one construction example.

Further, the changer unit includes the dx adder 62, the register 63 and the register rewriter 64 as one construction example, the second holding section includes the register 63 as one construction example, the second calculator includes the dx adder 62 as one construction example and the rewriter includes the register rewriter 64 as one construction example.

Figure 8:
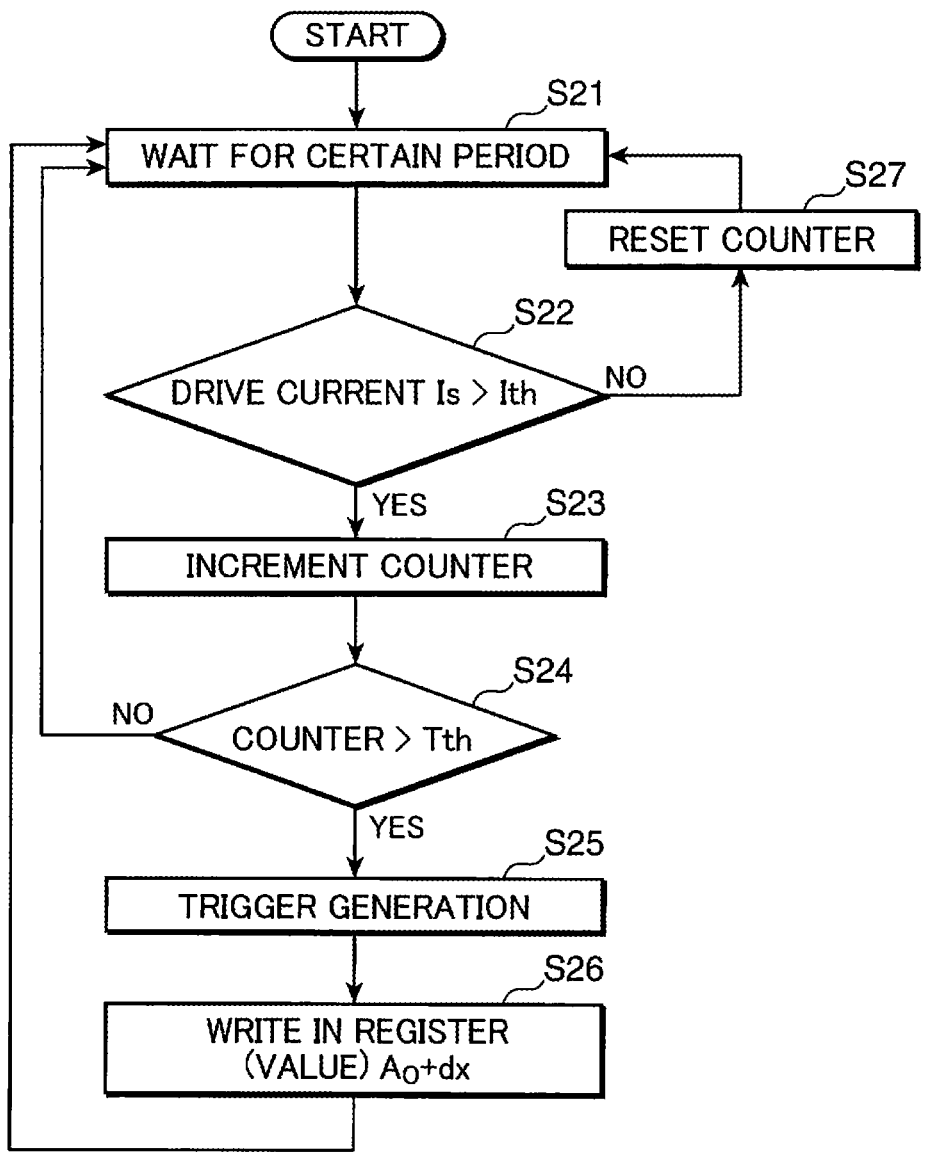
FIG. 8 is a flow chart showing an operation of the position control device shown in FIG. 7.

The operation of the position control device 1B constructed as above is described below. FIG. 8 is a flow chart showing the operation of the position control device according to the second embodiment.

In the imaging device C, its operation is started and an instruction value X indicating a position of the lens 28 (position of the movable member 24) to be driven is output from the imaging controller 6 to the subtractor 61 to be held therein, for example, for focusing of the lens 28. This instruction value X is output as an instruction value Xr from the subtractor 61 to the DAC 16 after having the offset value $A_O$ input from the register 63 subtracted therefrom in the subtractor 61. Note that the offset value $A_O$ of the register 63 is set at 0 $(=A_{Oi})$ as an initial value $A_{Oi}$ in this embodiment. The predetermined value dx is added to this offset value $A_O$ in the dx adder 62 and this addition result $(A_O+dx)$ is output to the register rewriter 64. On the other hand, in the DAC 16, the instruction value Xr is converted from a digital value into an analog value, and the instruction value Xr in the form of the analog value is output to the comparator 15. A resistance value Rs of the SMA member 21 detected by the resistance value detector 18 is input from the resistance value detector 18 to the comparator 15. In the comparator 15, the instruction value Xr from the DAC 16 and the resistance value Rs from the resistance value detector 18 are compared, and a control signal Sc corresponding to a difference between the two values is output from the comparator 15 to the current source 11. In the current source 11, the current value Is to be supplied to the SMA member 21 is controlled by this control signal Sc and output to the power amount detector 12.

Operations in Steps S21, S22, S23, S24 and S27 in FIG. 8 are respectively similar to those in Steps S11, S12, S13, S14 and S17 shown in FIG. 5 and, hence, are not described.

As a result of determination in Step S24, if a counter value has counted in excess of a time threshold value Tth (YES), Step S25 is performed to generate a trigger signal St, which is output from the power amount detector 12 to the register rewriter 64.

Subsequently, in Step S26, when the register rewriter 64 receives this trigger signal St, the offset value $A_O$ of the register 63 is rewritten into the value ($A_{Oi}$+dx) input from the dx adder 62 ($A_O \leftarrow A_{Oi}$+dx). By the output of the offset value $A_O$ (=$A_{Oi}$+dx) held in the register 63 to the subtractor 61, a value (X–$A_O$) (=X–($A_{Oi}$+dx)) smaller than the instruction value X by the offset value $A_O$ (=$A_{Oi}$+dx) is input as a new instruction value Xr to the comparator 15 via the DAC 16. Thus, the current value Is supplied from the current source 11 to the SMA member 21 is reduced.

Subsequently, when processing in Step S26 is performed, the routine returns to Step S21. Thus, if the current value Is supplied from the current source 11 to the SMA member 21 is still in excess of a current threshold value Ith even thought the instruction value X is reduced by the offset value $A_O$ (=$A_{Oi}$+dx), a value smaller than the instruction value (X–$A_O$) (=X–($A_{Oi}$+dx)) by the predetermined value dx is input as a new instruction value Xr (X–($A_{Oi}$+2dx)) via the DAC 16 by the execution of processings in the above Steps S21 to S26. In this way, if the current value Is supplied from the current source 11 to the SMA member 21 is still in excess of the current threshold value Ith, the instruction value X is successively reduced by the predetermined value dx. Thus, there is no likelihood of continuing to supply an overcurrent to the SMA member 21, thereby protecting the SMA member 21 from the supply of the overcurrent. The predetermined value dx is an amount by which the instruction value X is reduced each time.

When a new instruction value X is input from the imaging controller 6 while such a protection function is working, the position control device 1B is operated as described above based on this new instruction value X. If a current value Is corresponding to this new instruction value X is not in excess of the current threshold value Ith, the position control device 1B continues to normally perform a position control operation. Therefore, the position control device 1B according to the second embodiment can protect the SMA member 21 without stopping a position control even if an overcurrent is supplied to the SMA member 21 and the predetermined condition is satisfied.

The operation of the position control device 1B is more specifically described below by way of a specific example.

Figure 9:
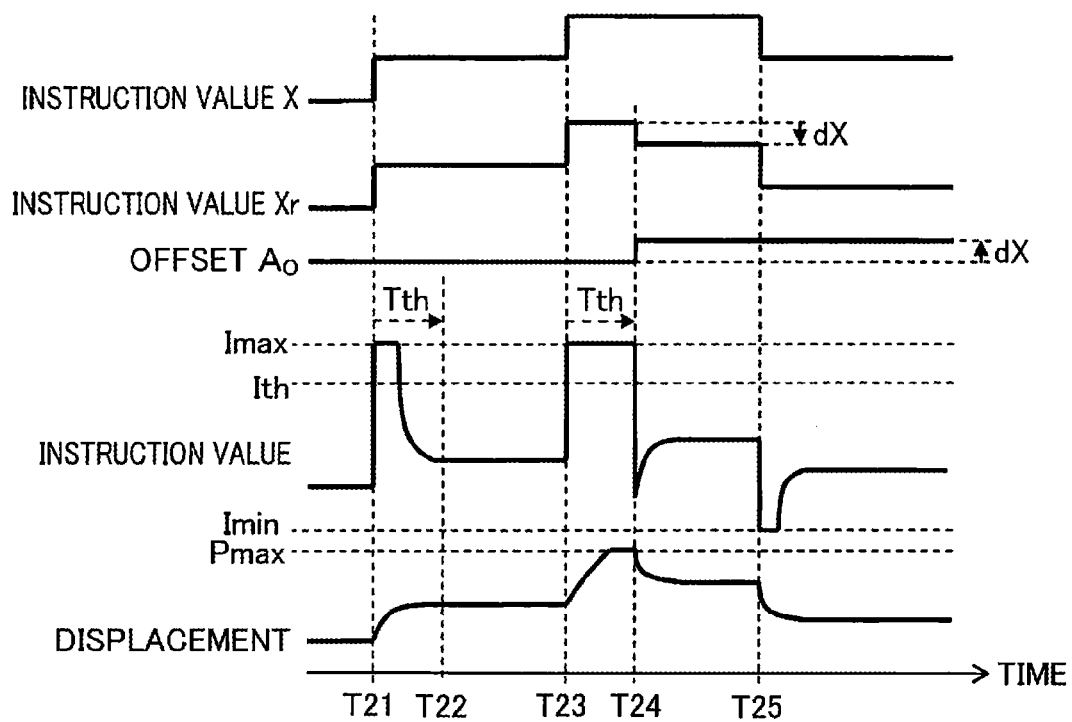
FIG. 9 is a time chart showing an example of the operation of the position control device shown in FIG. 7.

FIG. 9 is a time chart showing an example of the operation of the position control device according to the second embodiment. FIG. 9 shows respective time charts of the instruction value X, the instruction value Xr, the offset value $A_O$, the drive current Is of the SMA member 21 and the displacement of the movable member 24 in this order from above, wherein a horizontal axis is a time axis indicating lapsed time.

For example, when an instruction value X=Xa is input from the imaging controller 6 to the subtractor 61 at time T21 as shown in FIG. 9, the position control device 1B operates as described above and an instruction value Xr=Xa–$A_O$=Xra obtained by subtracting the offset value $A_O$ from the register 63 from the instruction value X=Xa is input from the DAC 16 to the comparator 15. Since the instruction value Xra and the resistance value Rs of the SMA member 21 detected by the resistance value detector 18 largely differ in this example, a relatively large current value Is, here a maximum current value Imax of the current source 11, is supplied from the current source 11 to the SMA member 21. Upon receiving the supply of this maximum current value Imax, the SMA member 21 returns (contracts) to the memory shape by current heating and is displaced toward a target displacement so that the movable member 24 (lens 28) is moved to a desired position. During this time, the current value Imax is in excess of the current threshold value Ith. Thus, Steps S21 to S24 shown in FIG. 8 are repeatedly performed at regular time intervals and a counter is incremented. When the SMA member 21 approaches the target displacement, the resistance value Rs of the SMA member 21 approaches the instruction value Xra in this example, with the result that the current Is supplied from the current source 11 to the SMA member 21 decreases from the maximum current value Imax and falls to or below the current threshold value Ith. Thus, the routine returns to Step S21 from Step S24 shown in FIG. 8, thereby ending counting-up of the counter. Then, the movable member 24 (lens 28) is moved to the desired position at time T22.

On the other hand, when an instruction value X=Xb (>Xa) is input from the imaging controller 6 to the subtractor 61 at time T23, the position control device 1B operates as described above, and an instruction value Xr=Xb–$A_O$=Xrb obtained by subtracting the offset value $A_O$ from the register 63 from the instruction value X=Xb is input from the DAC 16 to the comparator 15. It is assumed that Steps S21, S22 and S27 shown in FIG. 8 are performed during a period between times T22 and T23 and the counter is reset. Since the instruction value Xrb and the resistance value Rs of the SMA member 21 detected by the resistance value detector 18 largely differ in this example, a relatively large current value Is, here the maximum current value Imax of the current source 11, is supplied from the current source 11 to the SMA member 21. Upon receiving the supply of this maximum current value Imax, the SMA member 21 returns (contracts) to the memory shape by current heating and is displaced toward a target displacement so that the movable member 24 (lens 28) is moved to a desired position. During this time, the current value Imax is in excess of the current threshold value Ith. Thus, Steps S21 to S24 shown in FIG. 8 are repeatedly performed at regular time intervals and the counter is incremented. In the example shown in FIG. 8, the maximum current value Imax is supplied from the current source 11 to the SMA member 21 even if the movable member 24 comes into contact with the upper restricting member 27a and the displacement of the movable member 24 becomes the maximum value Pmax. Thus, Steps S21 to S24 shown in FIG. 8 are repeatedly performed at regular time intervals, the counter is further incremented and eventually the counter value exceeds the time threshold value Tth. Thus, Step S25 is performed following Step S24, a trigger signal St is output from the power amount detector 12 to the register rewriter 64, and the register rewriter 64 rewrites the register 63 with a value ($A_O$+dx), which will become a new offset value $A_O$ to be held in the register 63. As a result, the value from the DAC 16 to be compared with the resistance value Rs of the SMA member 21 from the resistance value detector 18 in the comparator 15 becomes a value (Xrb–($A_O$+dx)) smaller than the instruction value Xrb by the offset value $A_O$, the current value Is supplied from the current source 11 to the SMA member 21 decreases from the maximum current value Imax and falls to or below the current threshold value Ith. Thus, the routine returns to Step S21 from Step S24 shown in FIG. 8, thereby ending counting-up of the counter. Then, the SMA member 21 becomes stationary after a displacement corresponding to the value (Xrb−(A$_O$+dx)) smaller than the instruction value Xrb by the offset value A$_O$ and the movable member 24 (lens 28) stops at a position corresponding to this value (Xrb−(A$_O$+dx)).

When an instruction value X=Xc (<Xb) is input from the imaging controller 6 to the subtractor 61 at time T25, the position control device 1B starts operating as described above. Here, a value rewritten by the rewriting operation of the register rewriter 64 in the past is maintained as the offset value A of the register 63. Thus, when the instruction value X is updated to the instruction value Xc, the position control device 1B operates with the offset value A$_O$ left in the register 63. Therefore, even if the amount of power supplied from the current source 11 to the SMA member 21 exceeds the power amount corresponding to the instruction value Xc due to a variation of the resistance value or a circuit variation caused by a change in an operating environment of the position control device 1B, this can be corrected.

As described above, the position control device 1B according to the second embodiment can protect the SMA member 21 without stopping a position control even if an overcurrent is supplied to the SMA member 21 and the predetermined condition is satisfied.

Next, another embodiment is described.

Third Embodiment

Figure 10:
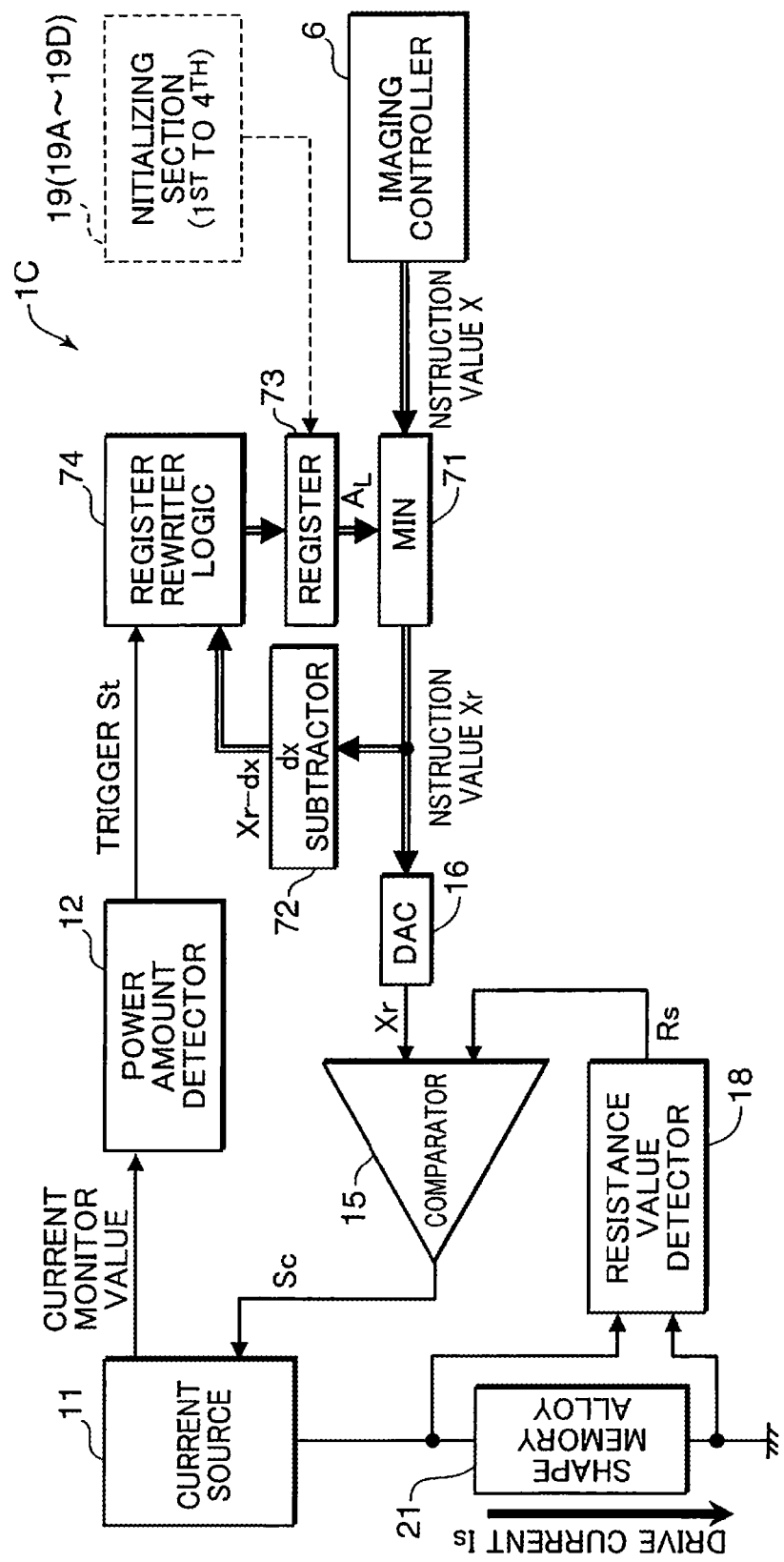
FIG. 10 is a block diagram showing a construction of a position control device according to a third embodiment of the invention.

FIG. 10 is a block diagram showing a construction of a position control device according to a third embodiment. A position control device 1C according to the third embodiment as the position controller 1 includes the control unit, the detector unit and the changer unit and, in this embodiment, the changer unit includes a third holding section for holding a limit value, a third calculator for calculating a change limit value by changing the limit value to reduce the temperature of the SMA member 21, and a third rewriter for rewriting the limit value held in the third holding section into the change limit value calculated in the third calculator when the power amount is determined to be in excess of the threshold value in the detector unit, and the control unit includes a selector for comparing an instruction value and the limit value held in the third holding section and selecting the smaller one of them, and a third controller for controlling the position of the movable member 24 according to the value selected by the selector.

More specifically, the position control device 1C includes a current source 11, a power amount detector 12, a minimum value selector (MIN) 71, a dx subtractor 72, a register 73, a register rewriter 74, a comparator 15, a DAC 16 and a resistance value detector 18.

The instruction value Xr is successively reduced by the predetermined value dx by the register 17, the dx subtractor 14 and the register rewriter 13 for overcurrent protection of the SMA member 21 in the position control device 1A according to the first embodiment shown in FIG. 4, whereas an upper limit value of the instruction value Xr is limited to a register value A$_L$ of the register 73 by the minimum value selector 71, the dx subtractor 72, the register 73 and the register rewriter 74 in the position control device 1C according to the third embodiment. Thus, the current source 11, the power amount detector 12, the comparator 15, the DAC 16 and the resistance value detector 18 of the position control device 1C of the third embodiment are respectively similar to the current source 11, the power amount detector 12, the comparator 15, the DAC 16 and the resistance value detector 18 in the position control device 1A of the first embodiment and, hence, are not described.

The register 73 is a circuit for holding (storing) an upper limit value A$_L$ of the instruction value Xr to be output to the comparator 15 and is, for example, composed of a plurality of flip-flop circuits and the like. The upper limit value A$_L$ held in the register 73 is output from the register 73 to the minimum value selector 71. A relatively large value, e.g. a maximum possible value of the register 73 or a value equal to or larger than a value which can be output from the imaging controller 6, is set as an initial value A$_{Li}$ of the upper limit value A$_L$ held in the register 73 at the time of initialization, e.g. start-up of the imaging device C.

The minimum value selector 71 is a circuit for comparing the instruction value X input from the imaging controller 6 and the upper limit value A$_L$ input from the register 63 and outputting the smaller one of them. Specifically, the minimum value selector 71 outputs the upper limit value A$_L$ if X>A$_L$ while outputting the instruction value X if X≤A$_L$. This value selected by the minimum value selector 71 is output as an instruction value Xr to the DAC 16 and the dx subtractor 72. Here, an output of the minimum value selector 71 is expressed as the instruction value Xr because the value output from the minimum value selector 71 is different from the instruction value X input from the imaging controller 6 in specified cases as in the case of the first embodiment.

The dx subtractor 72 is a circuit for subtracting a predetermined value dx set beforehand to the instruction value Xr output from the minimum value selector 71. This difference value (Xr−dx) is output to the register rewriter 74.

When a trigger signal St is input from the power amount detector 12, the register rewriter 74 rewrites the upper limit value A$_L$ of the register 73 into the value (Xr−dx) input from the dx subtractor 72 (A$_L$←A$_L$−dx). In other words, the register 73 will hold (Xr−ndx) by n rewriting operations of the register rewriter 74 (n=1, 2, 3, . . . ).

Here, the control unit includes the current source 11, the comparator 15, the DAC 16, the resistance value detector 18 and the minimum value selector 71 as one construction example, the selector includes the minimum value selector 71 as one construction example, and the third controller includes the current source 11, the DAC 16, the comparator 15 and the resistance value detector 18 as one construction example.

Further, the changer unit includes the dx subtractor 72, the register 73 and the register rewriter 74 as one construction example, the third holding section includes the register 73 as one construction example, the third calculator includes the dx subtractor 72 as one construction example and the rewriter includes the register rewriter 74 as one construction example.

Figure 11:
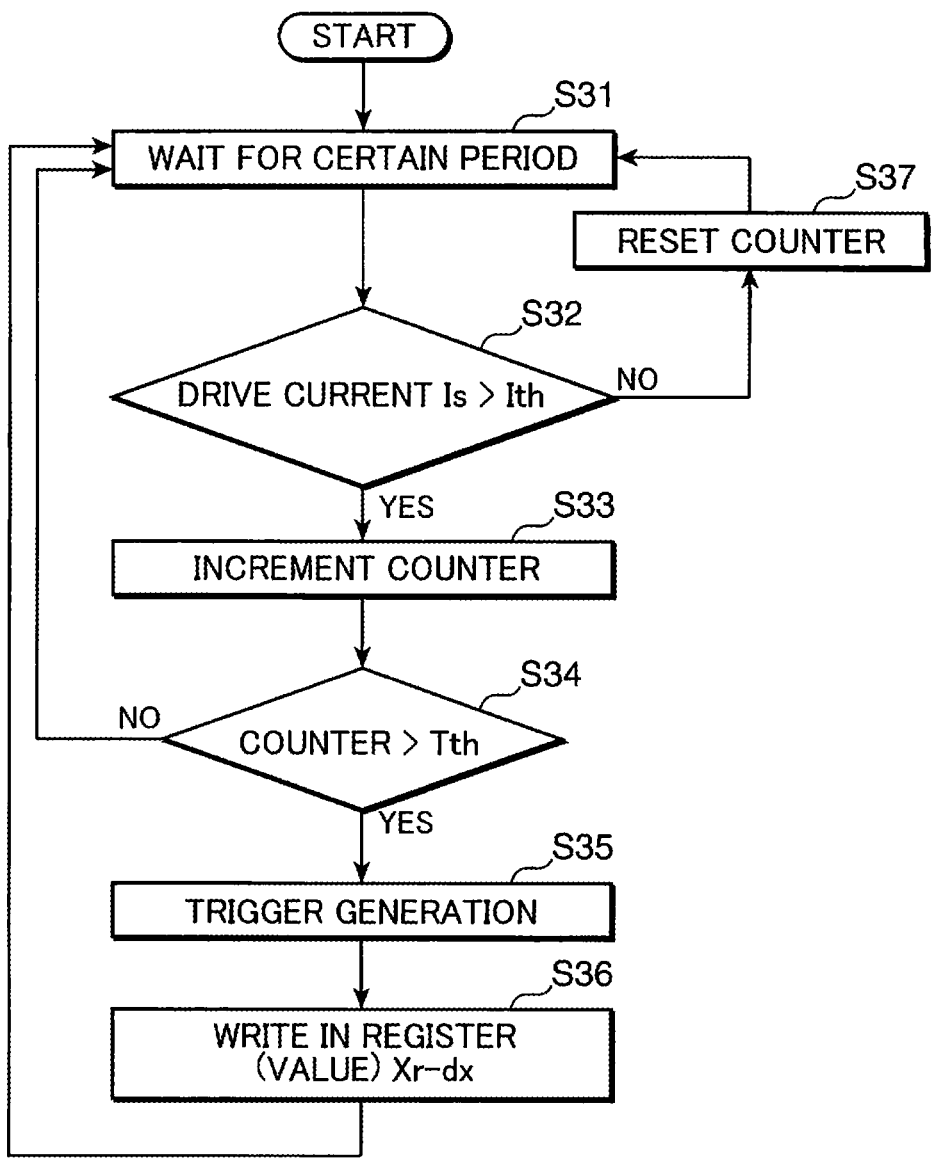
FIG. 11 is a flow chart showing an operation of the position control device shown in FIG. 10.

The operation of the position control device 1C constructed as above is described below. FIG. 11 is a flow chart showing the operation of the position control device according to the third embodiment.

In the imaging device C, its operation is started and an instruction value X indicating a position of the lens 28 (position of the movable member 24) to be driven is output from the imaging controller 6 to the minimum value selector 71, for example, for focusing of the lens 28. In the minimum value selector 71, the instruction value X from the imaging controller 6 and the upper limit value A$_L$ from the register 73 are compared, the smaller one of them is selected, and this selected value is output as an instruction value Xr from the minimum value selector 71 to the dx subtractor 72 and the DAC 16. In the dx subtractor 72, the predetermined value dx is subtracted from this instruction value Xr, and this subtraction result (Xr−dx) is output to the register rewriter 74. On the other hand, in the DAC 16, the instruction value Xr is converted from a digital value into an analog value, and the instruction value Xr in the form of the analog value is output to the comparator 15. A resistance value Rs of the SMA member 21 detected by the resistance value detector 18 is input from the resistance value detector 18 to the comparator 15. In the comparator 15, the instruction value Xr from the DAC 16 and the resistance value Rs from the resistance value detector 18 are compared, and a control signal Sc corresponding to a difference between the two values is output from the comparator 15 to the current source 11. In the current source 11, the current value Is to be supplied to the SMA member 21 is controlled by this control signal Sc and output to the power amount detector 12.

Operations in Steps S31, S32, S33, S34 and S37 in FIG. 11 are respectively similar to those in Steps S11, S12, S13, S14 and S17 shown in FIG. 5 and, hence, are not described.

If a counter has counted in excess of a time threshold value Tth (YES) as a result of determination in Step S34, Step S35 is performed to generate a trigger signal St, which is output from the power amount detector 12 to the register rewriter 74.

Subsequently, in Step S36, when the register rewriter 74 receives this trigger signal St, the upper limit value $A_L$ of the register 73 is rewritten into the value (Xr−dx) input from the dx subtractor 72 ($A_L$←Xr−dx). Thus, the upper limit value $A_L$ (=Xr−dx) smaller than the instruction value X is selected in the minimum value selector 71. Hence, the value (Xr−dx) smaller than the instruction value X by the predetermined value dx is input as a new instruction value Xr to the comparator 15 via the DAC 16. Therefore, the current value Is supplied from the current source 11 to the SMA member 21 is reduced.

Subsequently, when processing in Step S36 is performed, the routine returns to Step S31. Thus, if the current value Is supplied from the current source 11 to the SMA member 21 is still in excess of a current threshold value Ith even thought the instruction value X is reduced by the predetermined value dx, the upper limit value $A_L$ of the register 73 is rewritten by the rewriting operation of the register rewriter 74 by the execution of processings in the above Steps S31 to S36 ($A_L$←Xr−2dx), and this upper limit value $A_L$ (=Xr−2dx) is output to the minimum value selector 71. In this way, in the minimum value selector 71, the upper limit value $A_L$ (=Xr−2dx) smaller than the instruction value X is selected, and the value (Xr−2dx) smaller than the last instruction value (Xr−dx) by the predetermined value dx is input as a new instruction value Xr via the DAC 16. In this way, if the current value Is supplied from the current source 11 to the SMA member 21 is in excess of the current threshold value Ith, the instruction value Xr is successively reduced by the predetermined value dx. Therefore, there is no likelihood of continuing to supply an overcurrent to the SMA member 21, thereby protecting the SMA member 21 from the supply of the overcurrent. The predetermined value dx is an amount by which the instruction value Xr is reduced each time.

When a new instruction value X is input from the imaging controller 6 while such a protection function is working, the position control device 1C is operated as described above based on this new instruction value X. If a current value Is corresponding to this new instruction value X is not in excess of the current threshold value Ith, the position control device 1C continues to normally perform a position control operation. Therefore, the position control device 1C according to the third embodiment can protect the SMA member 21 without stopping a position control even if an overcurrent is supplied to the SMA member 21 and the predetermined condition is satisfied.

As described above, the smaller one of the instruction value X from the imaging controller 6 and the register value $A_L$ from the register 73 is selected and output in the minimum value selector 71, and the output of the minimum value selector 71 is output as the instruction value Xr to the DAC 16 while being output to the dx subtractor 71 to be subtracted by the predetermined value dx. When a trigger signal St is input, the register rewriter 74 rewrites the register value $A_L$ of the register 73 into the output value from the dx subtractor 72. Thus, the register value $A_L$ held in the register 73 is an upper limit value of the instruction value Xr.

The operation of the position control device 1C is more specifically described below by way of a specific example.

Figure 12:
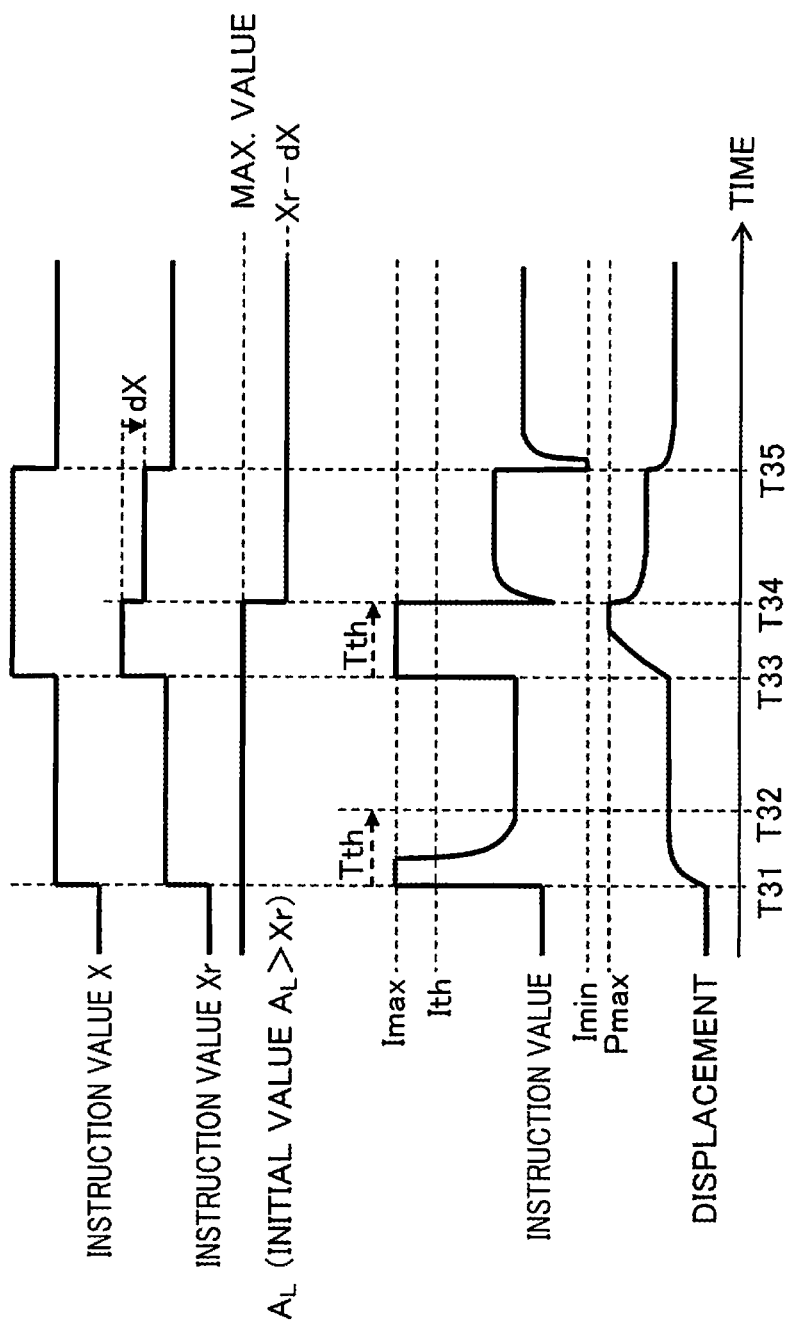
FIG. 12 is a time chart showing an example of the operation of the position control device shown in FIG. 10.

FIG. 12 is a time chart showing an example of the operation of the position control device according to the third embodiment. FIG. 12 shows respective time charts of the instruction value X, the instruction value Xr, the register value $A_L$ of the register 73, the drive current Is of the SMA member 21 and the displacement of the movable member 24 in this order from above, wherein a horizontal axis is a time axis indicating lapsed time.

For example, when an instruction value X=Xa is input from the imaging controller 6 to the minimum value selector 71 at time T31 as shown in FIG. 12, the position control device 1C operates as described above, whereby the instruction value X=Xa from the imaging controller 6 and a register value (upper limit value) from the register 73 are compared and the smaller value, i.e. the instruction value Xr=Xa=Xra is input from the DAC 16 to the comparator 15 since the initial value is set in the register 73 at this stage. Since the instruction value Xra and the resistance value Rs of the SMA member 21 detected by the resistance value detector 18 largely differ in this example, a relatively large current value Is, here a maximum current value Imax of the current source 11, is supplied from the current source 11 to the SMA member 21. Upon receiving the supply of this maximum current value Imax, the SMA member 21 returns (contracts) to the memory shape by current heating and is displaced toward a target displacement so that the movable member 24 (lens 28) is moved to a desired position. During this time, the current value Imax is in excess of the current threshold value Ith. Thus, Steps S31 to S34 shown in FIG. 11 are repeatedly performed at regular time intervals and the counter is incremented. When the SMA member 21 approaches the target displacement, the resistance value Rs of the SMA member 21 approaches the instruction value Xra in this example, with the result that the current Is supplied from the current source 11 to the SMA member 21 decreases from the maximum current value Imax and falls to or below the current threshold value Ith. Thus, the routine returns to Step S31 from Step S34 shown in FIG. 11, thereby ending counting-up of the counter. Then, the movable member 24 (lens 28) is moved to the desired position at time T32.

On the other hand, when an instruction value X=Xb (>Xa) is input from the imaging controller 6 to the register 17 at time T33, the position control device 1C operates as described above, whereby the instruction value X=Xb from the imaging controller 6 and the register value (upper limit value) from the register 73 are compared and the smaller value, i.e. the instruction value Xr=Xb=Xrb is input from the DAC 16 to the comparator 15 since the initial value is set in the register 73 at this stage. It is assumed that Steps S31, S32 and S37 shown in FIG. 11 are performed during a period between times T32 and T33 and the counter is reset. Since the instruction value Xrb and the resistance value Rs of the SMA member 21 detected by the resistance value detector 18 largely differ in this example, a relatively large current value Is, here the maximum current value Imax of the current source 11, is supplied from the current source 11 to the SMA member 21. Upon receiving the supply of this maximum current value Imax, the SMA member 21 returns (contracts) to the memory shape by current heating and the SMA member 21 is displaced toward a target displacement so that the movable member 24 (lens 28) is moved to a desired position. During this time, the current value Imax is in excess of the current threshold value Ith. Thus, Steps S31 to S34 shown in FIG. 11 are repeatedly performed at regular time intervals and the counter is incremented. In the example shown in FIG. 12, the maximum current value Imax is supplied from the current source 11 to the SMA member 21 even if the movable member 24 comes into contact with the upper restricting member 27a and the displacement of the movable member 24 becomes the maximum value Pmax. Thus, Steps S31 to S34 shown in FIG. 11 are further repeatedly performed at regular time intervals, the counter is further incremented and eventually the counter value exceeds the time threshold value Tth. Thus, Step S35 is performed following Step S34, a trigger signal St is output from the power amount detector 12 to the register rewriter 74, and the register rewriter 74 rewrites the register 73 with a value (Xrb−dx). As a result, the value from the DAC 16 to be compared with the resistance value Rs of the SMA member 21 from the resistance value detector 18 in the comparator 15 decreases from the instruction value Xrb to the value (Xrb−dx), the current value Is supplied from the current source 11 to the SMA member 21 decreases from the maximum current value Imax and falls to or below the current threshold value Ith since the instruction value Xb=Xrb and the register value (upper limit value) $A_L$=Xrb−dx are compared and selected in the minimum value selector 71. Thus, the routine returns to Step S31 from Step S34 shown in FIG. 11, thereby ending counting-up of the counter. Then, the SMA member 21 becomes stationary after a displacement corresponding to the value (Xrb−dx) and the movable member 24 (lens 28) stops at a position corresponding to the value (Xrb−dx).

When an instruction value X=Xc (<Xb) is input from the imaging controller 6 to the minimum value selector 71 at time T35, the position control device 1C starts operating as described above.

As described above, the position control device 1C according to the third embodiment can protect the SMA member 21 without stopping a position control even if an overcurrent is supplied to the SMA member 21 and the predetermined condition is satisfied.

Next, the operation of the imaging device C according to this embodiment is described.

Figure 13:
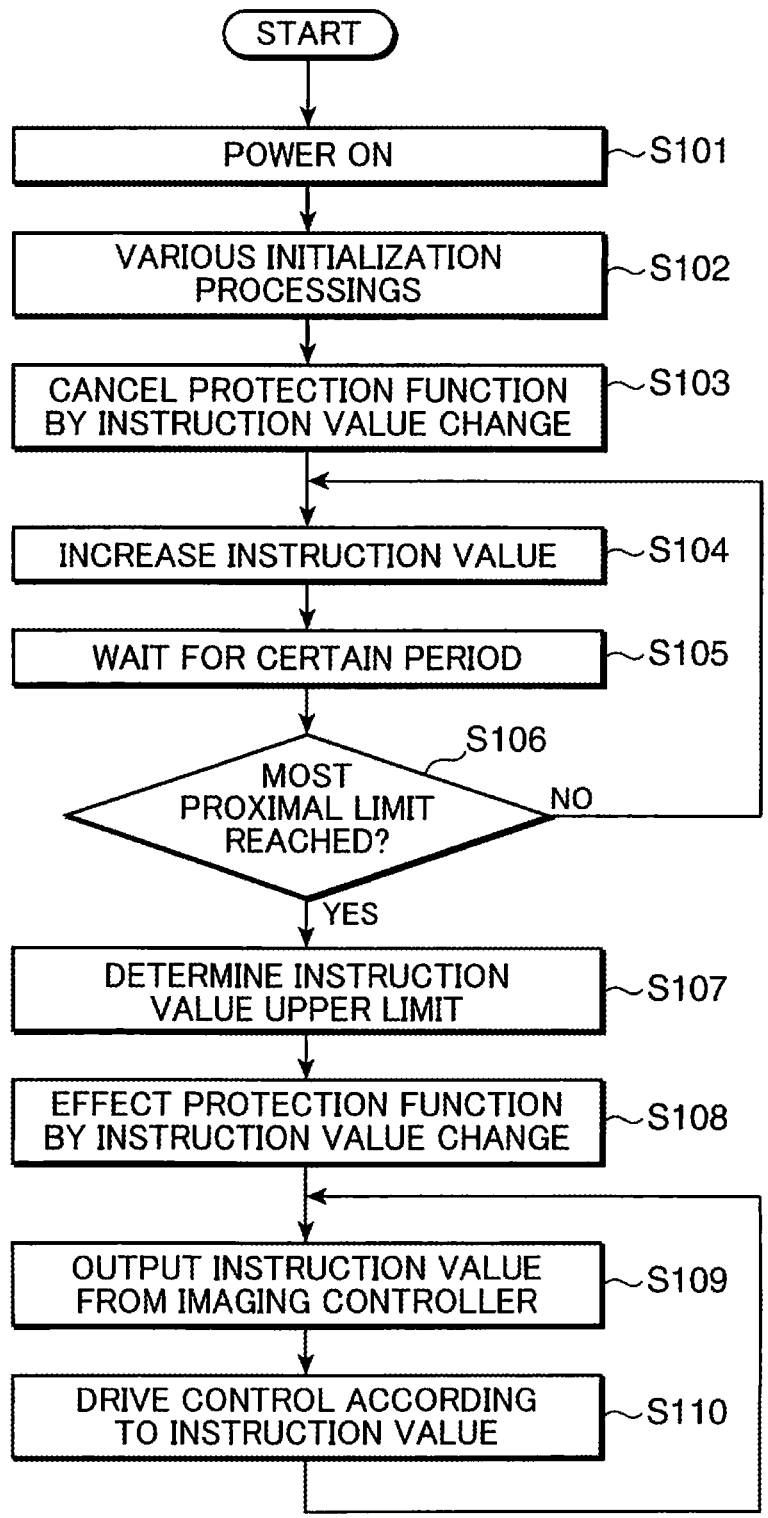
FIG. 13 is a flow chart showing an operation of the imaging device according to the embodiment.

FIG. 13 is a flow chart showing the operation of the imaging device according to this embodiment. In FIG. 13, when an unillustrated power switch is first pressed to turn a power supply on in Step S101, the respective parts of the imaging device C are initialized in Step S102. Subsequently, the protection function by a change of an instruction value in the position control devices 1A to 1C according to the above first to third embodiments is canceled (turned off) to set a reference position for the position control of the movable member 24.

Subsequently, an instruction value X is increased by the imaging controller 6 in Step S104, it is waited for a certain fixed period set beforehand in Step S105, and whether or not the movable member 24 (lens 28) has reached the most proximal limit is judged in Step S106. This judgment is made, for example, based on whether or not there has been any change in the resistance value Rs of the SMA member 21. Alternatively, this judgment is made, for example, by determining a target image in an optical image of a subject imaged by the imaging element 29 and judging whether or not there is any change in the size of this target image. Further alternatively, this judgment is made by providing the upper restricting member 27a with a mechanically operable switch such as a limit switch and by this switch being turned on by the contact of the movable member 24 with the upper restricting member 27a. If the movable member 24 has reached the most proximal limit (YES) as a result of this judgment, Step S107 is performed. On the other hand, if the movable member 24 has not reached the most proximal limit (NO) as a result of this judgment, this routine returns to Step S104. Thus, the imaging device C judges whether or not the movable member 24 has reached the most proximal limit while successively increasing the instruction value X.

In Step S107, the instruction value X when the movable member 24 is judged to have reached the most proximal limit is determined as an instruction value upper limit by the imaging controller 6. In this way, the reference position of the movable member 24 in controlling the position of the movable member 24 (lens 28) and the value of the instruction value X (resistance value Rs of the SMA member 21) are related. Note that the instruction value upper limit may be a value obtained by subtracting a small margin amount from the instruction value X when the movable member 24 is judged to have reached the most proximal limit.

By such an operation of the imaging controller 6, a movable limit position of the movable member 24 (lens 28) is detected at the start-up and an instruction value range is determined based on this detection result.

Subsequently, the protection function canceled in Step S103 is effected (turned on) in Step S108, the imaging operation is started in Step S109, thereby outputting the instruction value X from the imaging controller 6 to the position controller 1 (position control device 1A to 1C), and the imaging unit 2 is driven and controlled by the position controller 1 (position control device 1A to 1C) to control the position of the movable member 24 (lens 28) according to the instruction value X in Step S110.

In the above embodiment, the current source 11 may supply power to the SMA member 21 by a so-called PWM method. In this PWM method, the current source 11 supplies power to the SMA member 21 by current pulses (voltage pulses) and the supplied power is controlled (adjusted) by modulating a pulse width. In this case, the predetermined condition is whether or not a pulse width PW of PWM is in excess of a first pulse width threshold value PWth1 set beforehand and an application number (supply number) Np of such pulses is in excess of a first pulse number threshold value Npth1. The power amount detector 12 determines that the power amount has exceeded the threshold value, i.e. the predetermined condition is satisfied and outputs a trigger signal to the register rewriter 13 if the application number Np of the current pulses (or voltage pulses) supplied to the SMA member 21 by the PWM method and having pulse widths in excess of the first pulse width threshold value PWth1 set beforehand exceeds the first pulse number threshold value Npth1 set beforehand.

Figure 14:
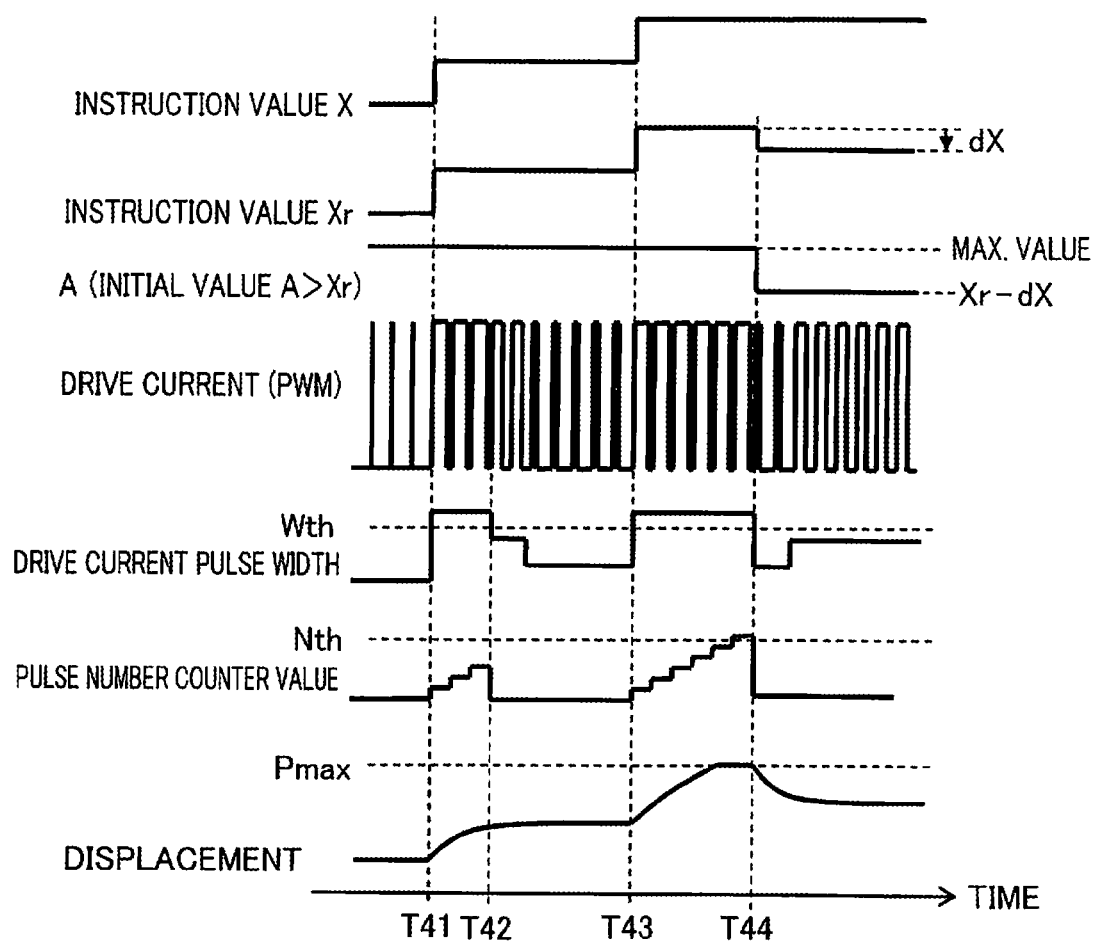
FIG. 14 is a time chart showing an example of the operation of the position control device when power is supplied to a shape memory alloy member by a PWM method.

FIG. 14 is a time chart showing an example of the operation of the position control device in the case of supplying power to the shape memory alloy member by the PWM method. FIG. 14 shows respective time charts of the instruction value X, the instruction value Xr, the register value A of the register 17, 63, 73, the drive current Is of the SMA member 21, the current pulse width PW, a counter value on the pulse number, and the displacement of the movable member 24 in this order from above, wherein a horizontal axis is a time axis indicating lapsed time.

In such a case, the current pulse width PW of the drive current Is is in excess of the first pulse width threshold value Pwth1 during periods between times T41 and T42 and between times T43 and T44, and the counter on the pulse number is counted up every time a current pulse is supplied to the SMA member 21 to bring the movable member 24 (lens 28) to a target position as shown in FIG. 14. Between times T41 and T42, the movable member 24 reaches the target position and becomes stationary, the current pulse width PW of the drive current Is falls to or below the first pulse width threshold value PWth1 and counting-up of the counter on the pulse number is ended before the counter value on the pulse number exceeds the first pulse number threshold value Npth1. On the other hand, between times T41 and T44, the counter on the pulse number is counted up and, eventually, the counter value exceeds the first pulse number threshold value Npth1, the protection function works, the instruction value Xr is reduced by dx, the current value Is supplied from the current source 11 to the SMA member 21 decreases from the maximum current value Imax, and the current pulse width PW of the current value Is supplied from the current source 11 to the SMA member 21 falls to or below the first pulse width threshold value PWth1.

In the above second and third embodiments, the position control devices 1B, 1C may further include a cancel function of canceling the protection function. The protection function is thought to be invoked, for example, due to a characteristic change of the SMA member 21, a circuit drift or an increase in drive load caused by a change in operating environment. Thus, for example, the position control devices 1B, 1C in the above second and third embodiments may further include, as shown by dotted line in FIGS. 7 and 10, a first initializing section 19A for detecting the amount of power supplied to the SMA member 21, judging whether or not the detected power amount is equal to or below a second threshold value Wth2 set beforehand, and initializing the register 63, 73 when the detected power amount is equal to or below the second threshold value Wth2 set beforehand as a result of this judgment. By this construction, a continual state of the protection function can be automatically canceled and the protection function can work from an initial state on.

Figure 15:
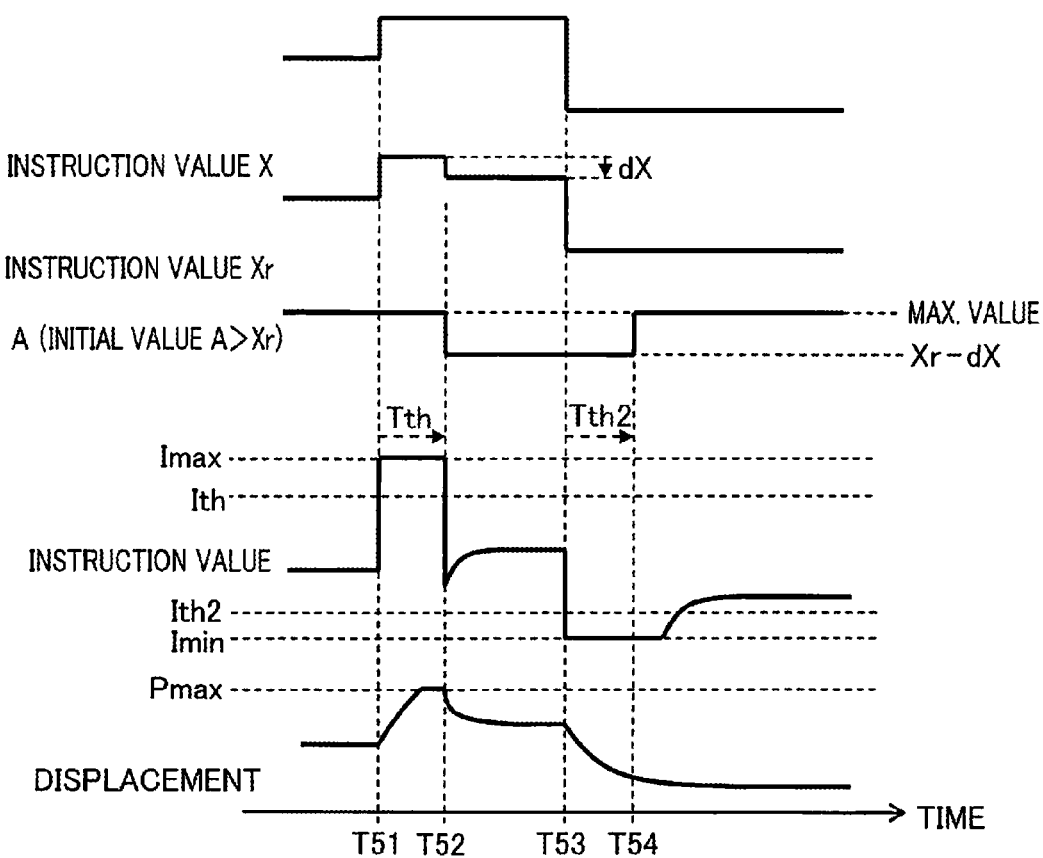
FIG. 15 is a time chart showing an example of the operation of the third position control device when a protection function is released.

FIG. 15 is a time chart showing an example of the operation of the third position control device in the case of canceling the protection function. FIG. 15 shows respective time charts of the instruction value X, the instruction value Xr, the register value $A_L$ of the register 73, the drive current Is of the SMA member 21, and the displacement of the movable member 24 in this order from above, wherein a horizontal axis is a time axis indicating lapsed time.

In FIG. 15, between times T51 and T52, the protection function works by the above operation, and a value $A_L$=Xr−ndx different from the initial value is held (stored) as the register value $A_L$ of the register 73. Between times T53 and T54, the first initializing section 19A detects the amount of power supplied to the SMA member 21 and judges whether or not this detected power amount is equal to or below the second threshold value Wth2 set beforehand. Between times T53 and T54, this detected power amount is equal to or below the second threshold value Wth2 set beforehand as a result of this judgment. Thus, at time T54, the first initializing section 19A initializes the register 73 and sets its initial value $A_{Li}$ (maximum value of the instruction value X that can be output from the imaging controller 6 in an example shown in FIG. 15).

More specifically, in the example shown in FIG. 15, the amount of power supplied to the SMA member 21 is judged by the drive current Is supplied to the SMA member 21. Accordingly, the first initializing section 19A detects the drive current Is supplied to the SMA member 21 and judges whether or not this detected drive current Is is equal to or below a second current threshold value Ith2. At time T53, as a result of this judgment, this detected drive current Is is judged to be equal to or below the second current threshold value Ith2. Then, a duration Ts during which the drive current Is is equal to or below the second current threshold value Ith2 is measured. For example, whether or not the drive current Is is equal to or below the second current threshold value Ith2 is judged at specified time intervals, and the counter is counted up to measure the duration Ts if the drive current Is is judged to be equal to or below the second current threshold value Ith2. Then, it is judged whether or not this duration Ts is equal to or above a second time threshold value Tth2 set beforehand and, at time T54, the duration Ts is in excess of the second time threshold value Tth2. Thus, at time T54, the first initializing section 19A initializes the register 73 and sets its initial value $A_{Li}$.

FIG. 15 shows the case of the third position control device 1C, which is described above. However, the case of the second position control device 1B can also be similarly described.

For example, in the position control devices 1B and 1C according to the above second and third embodiments, a current or voltage may be supplied to the SMA member 21 by the PWM method and a second initializing section 19B may be, as shown by dotted line in FIGS. 7 and 10, further provided for detecting current or voltage pulses supplied to the SMA member 21 by the PWM method, judging whether or not pulse widths of the detected pulses are equal to or below a second pulse width threshold value PWth2 set beforehand and whether or not a number of times, at which the pulse width exceeded the first pulse width threshold value PWth1, is equal to or below a second number threshold value Npth2 set beforehand, and initializing the register 63, 73 when the pulse width of the detected pulse is equal to or below the second pulse width threshold value PWth2 or when the number of time, at which the pulse width exceeded the first pulse width threshold value PWth1, is equal to or below the second number threshold value Npth2 set beforehand as a result of this judgment. By this construction, a continual state of the protection function can be automatically canceled and the protection function can work from an initial state on even if power is supplied to the SMA member 21 by the PWM method (pulse width modulation method).

Figure 16:
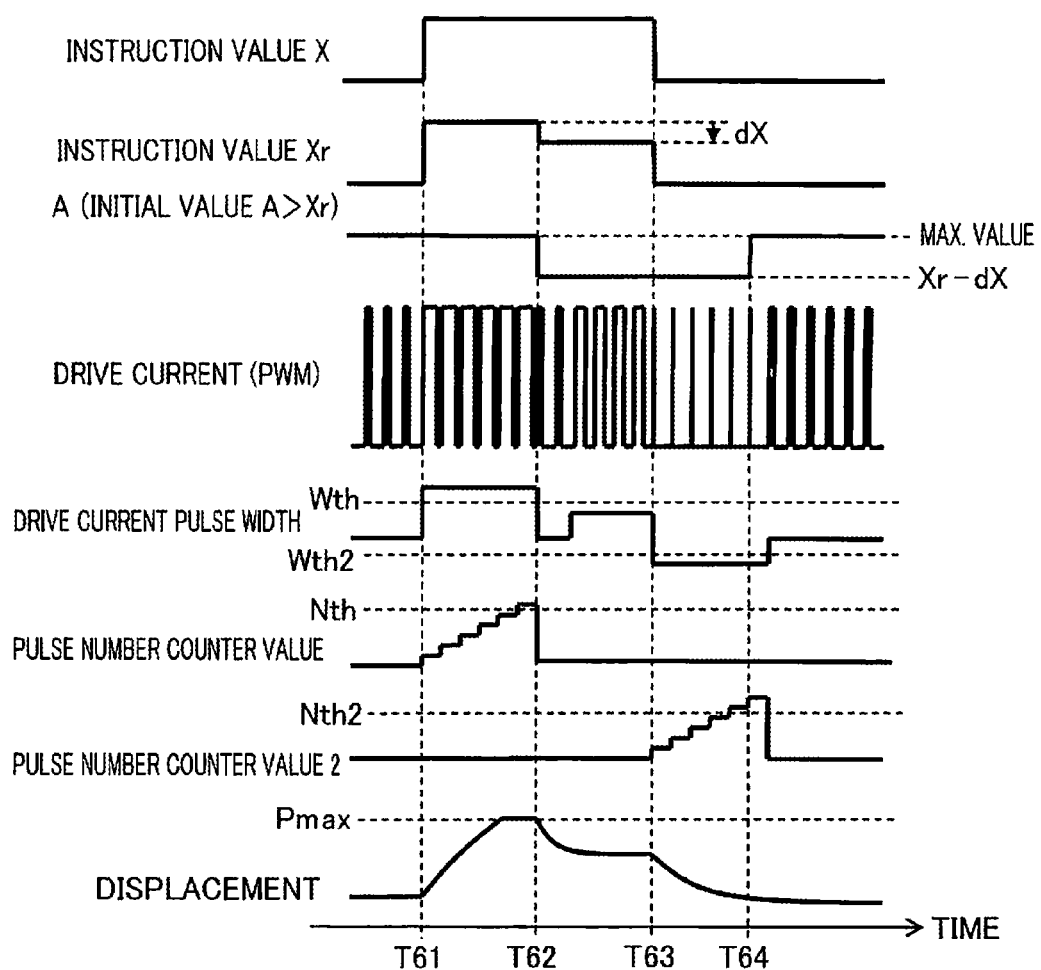
FIG. 16 is a time chart showing an example of the operation of the third position control device when power is supplied to the shape memory alloy member by the PWM method.

FIG. 16 is a time chart showing an example of the operation of the third position control device in the case of supplying power to the shape memory alloy member by the PWM method. FIG. 16 shows respective time charts of the instruction value X, the instruction value Xr, the register value $A_L$ of the register 73, the drive current Is of the SMA member 21, the current pulse width PW, counter values 1, 2 on the pulse number, and the displacement of the movable member 24 in this order from above, wherein a horizontal axis is a time axis indicating lapsed time. The counter value 1 on the pulse number is a number of current pulses whose pulse widths are in excess of the first pulse width threshold value PWth1, and the counter value 2 on the pulse number is a number of current pulses whose pulse widths are equal to or below the second pulse width threshold value PWth2.

In FIG. 16, between times T61 and T62, the protection function works by the above operation, and a value $A_L$=Xr−ndx different from the initial value is held (stored) as the register value $A_L$ of the register 73. Between times T63 and T64, the second initializing section 19B detects the amount of power supplied to the SMA member 21 and judges whether or not this detected power amount is equal to or below the second threshold value Wth2 set beforehand. Between times T63 and T64, this detected power amount is equal to or below the second threshold value Wth2 set beforehand as a result of this judgment. Thus, at time T64, the second initializing section 19B initializes the register 73 and sets its initial value $A_{Li}$ (maximum value of the instruction value X that can be output from the imaging controller 6 in an example shown in FIG. 16).

More specifically, in the example shown in FIG. 16, power is supplied to the SMA member 21 by the PWM method and the amount of this power is judged by the drive current Is supplied to the SMA member 21. Accordingly, the second initializing section 19B detects the current pulses of the drive current Is supplied to the SMA member 21 and judges whether or not the pulse width of the detected current pulse of the drive current Is is equal to or below the second pulse width threshold value PWth2. At time T63, as a result of this judgment, the pulse width of the detected current pulse of the drive current Is is judged to be equal to or below the second pulse width threshold value PWth2. Then, an application number (supply number) Np of the current pulse whose pulse width is equal to or below the second pulse width threshold value PWth2 is counted as the counter value 2 on the pulse number. For example, whether or not the pulse width of the current pulse of the drive current Is is equal to or below the second pulse width threshold value PWth2 is judged at specified time intervals, and the counter value 2 is counted up if the pulse width of the current pulse of the drive current Is is judged to be equal to or below the second pulse width threshold value PWth2. Then, it is judged whether or not this counter value 2 on the pulse number is equal to or above the second pulse number threshold value Npth2 set beforehand and, at time T64, the counter value 2 is in excess of the second pulse number threshold value Npth2. Thus, at time T64, the second initializing section 19B initializes the register 73 and sets its initial value $A_{Li}$.

FIG. 16 shows the case of the third position control device 1C, which is described above. However, the case of the second position control device 1B can also be similarly described.

For example, the position control devices 1B and 1C according to the above second and third embodiments may further include, as shown by dotted line in FIGS. 7 and 10, a third initializing section 19C for initializing the register 63, 73 when the instruction value X is equal to or below an instruction value threshold value Xth set beforehand. By this construction, a continual state of the protection function can be automatically canceled and the protection function can work from an initial state on when the instruction value X is equal to or below the instruction value threshold value Xth set beforehand such as when the instruction value X becomes sufficiently small.

Figure 17:
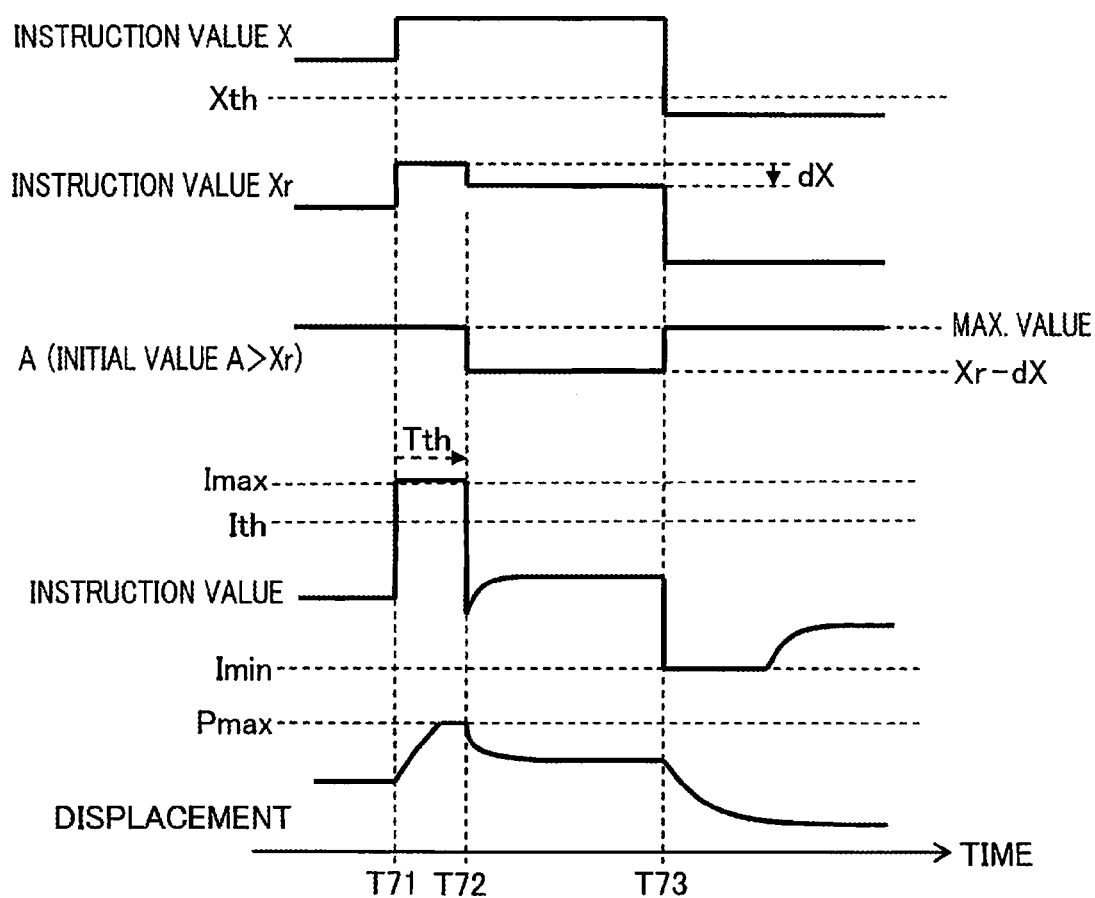
FIG. 17 is a time chart showing an example of the operation of the third position control device when the protection function is released by monitoring an instruction value X.
Figure 18:
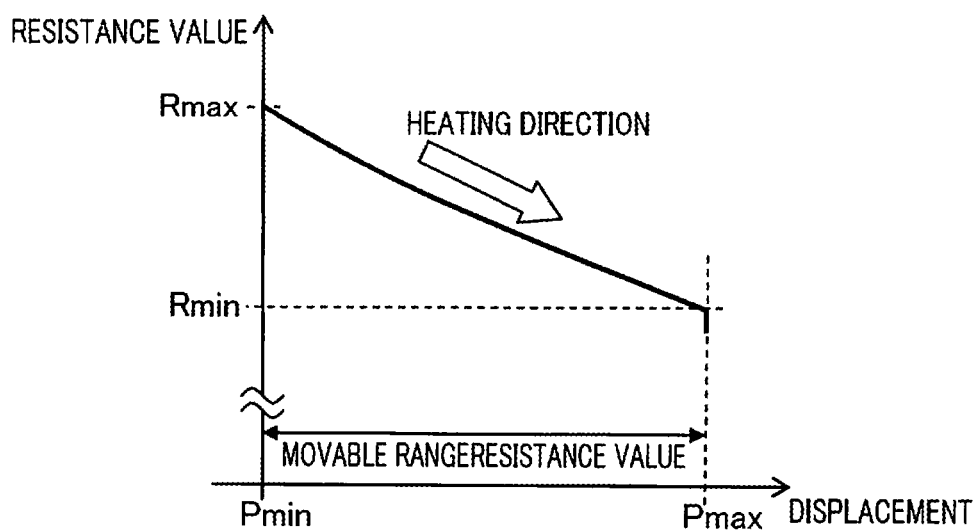
FIG. 18 is a graph showing a relationship between a displacement of a movable member and a resistance value of a shape memory alloy member.
Figure 19:
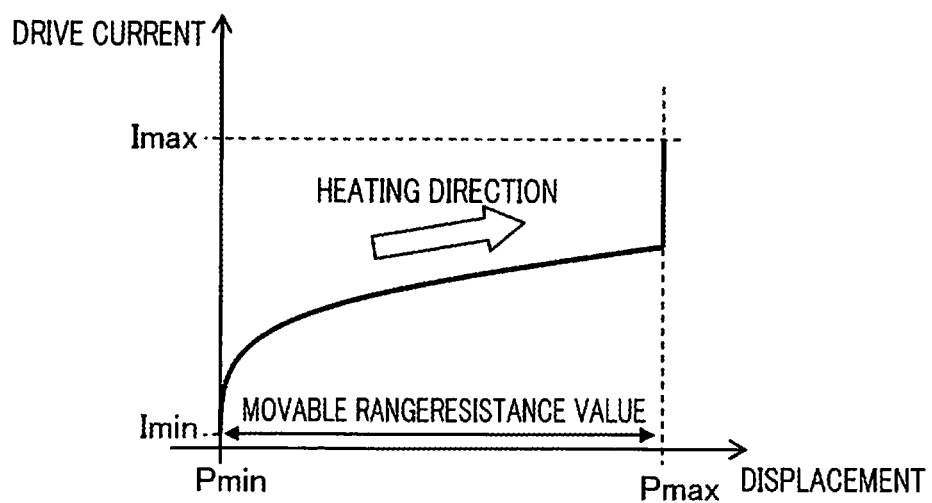
FIG. 19 is a graph showing a relationship between the displacement of the movable member and a drive current of the shape memory alloy member.
Figure 20:
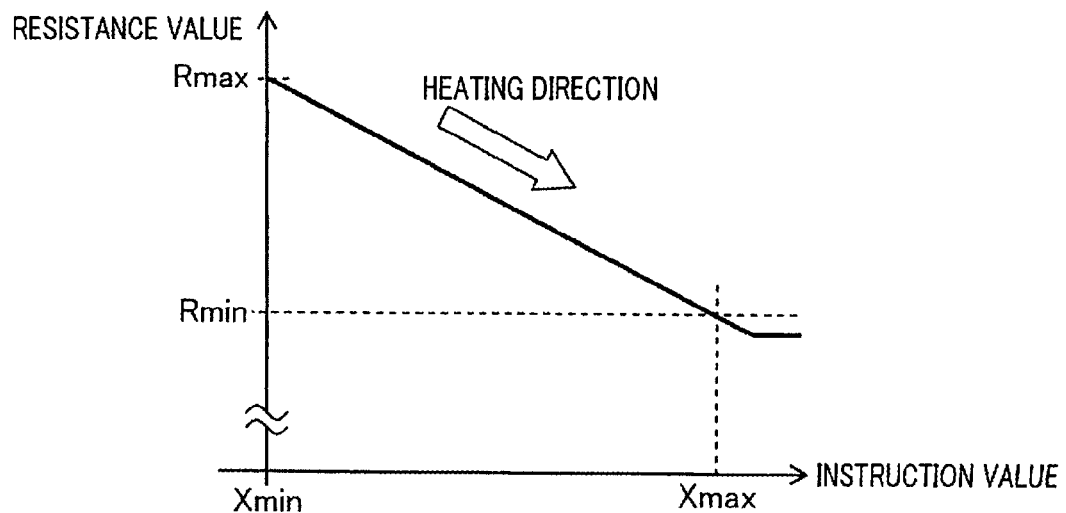
FIG. 20 is a graph showing a relationship between an instruction value indicating a position of the movable member as a control target and the resistance value of the shape memory alloy member.
Figure 21:
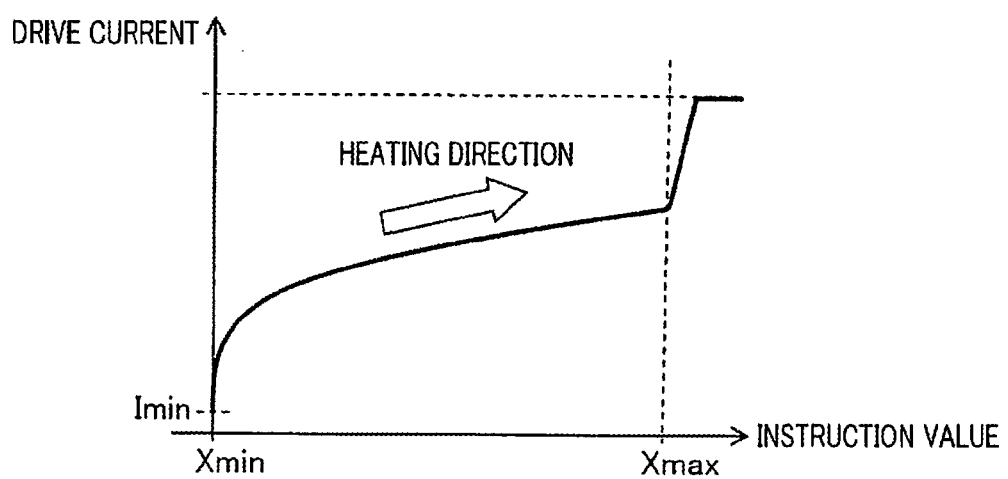
FIG. 21 is a graph showing a relationship between the instruction value indicating the position of the movable member as the control target and the drive current of the shape memory alloy member.
Figure 22:
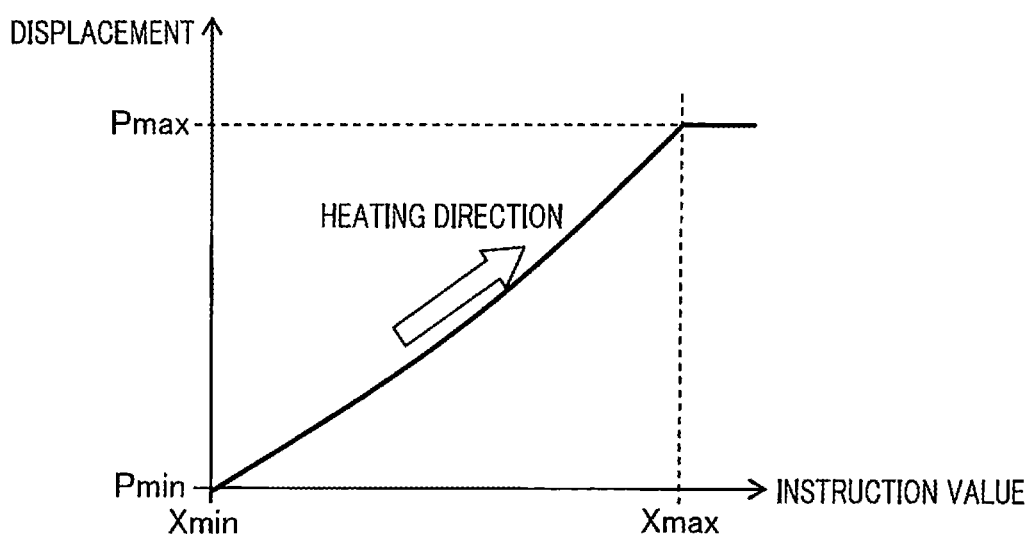
FIG. 22 is a graph showing a relationship between the instruction value indicating the position of the movable member as the control target and the displacement of the movable member.

FIG. 17 is a time chart showing an example of the operation of the third position control device in the case of canceling the protection function by monitoring the instruction value X. FIG. 17 shows respective time charts of the instruction value X, the instruction value Xr, the register value $A_{Li}$ of the register 73, the drive current Is of the SMA member 21, and the displacement of the movable member 24 in this order from above, wherein a horizontal axis is a time axis indicating lapsed time.

In FIG. 17, between times T71 and T72, the protection function works by the above operation, and a value $A_L$=Xr−ndx different from the initial value is held (stored) as the register value $A_L$ of the register 73. At time T73, the third initializing section 19C monitors the instruction value X and judges whether or not this instruction value X is equal to or below the instruction value threshold value Xth set beforehand. At time T73, this instruction value X is equal to or below the instruction value threshold value Xth set beforehand as a result of this judgment. Thus, at time T73, the third initializing section 19C initializes the register 73 and sets its initial value $A_{Li}$ (maximum value of the instruction value X that can be output from the imaging controller 6 in an example shown in FIG. 17).

FIG. 17 shows the case of the third position control device 1C, which is described above. However, the case of the second position control device 1B can also be similarly described.

For example, the position control devices 1A to 1C of the above first to third embodiments may further include, as shown by dotted line in FIGS. 4, 7 and 10, a fourth initializing section 19D for initializing the register 17, 63, 73 when receiving a command for initializing the register 17, 63, 73 from outside. The fourth initializing section 19D may be, for example, composed of a switch such as a push button switch. An initial value of the register 17 is arbitrarily set, e.g. set at a value corresponding to the reference position of the movable member 24. By this construction, the continual state of the protection function can be canceled by giving a command for initializing the register 17, 63, 73 from outside, for example, by judgment of an external system or the like and the protection function can work from an initial state on.

This specification discloses various forms of technologies. Out of these, main technologies are summarized below.

In one aspect, a position control device used in a shape memory alloy actuator for moving a movable member using a shape memory alloy member by a biasing applying method and adapted to control the position of the movable member comprises a control unit for controlling the position of the movable member according to an instruction value indicating a position of the movable member as a control target; a detector unit for detecting an amount of power supplied to the shape memory alloy member and determining whether or not this detected power amount is in excess of a first threshold value set beforehand; and a changer unit for changing the instruction value to reduce the temperature of the shape memory alloy member when the power amount is determined to be in excess of the first threshold value in the detector unit.

In another mode, a position control method used in a shape memory alloy actuator for moving a movable member using a shape memory alloy member by a biasing applying method and adapted to control the position of the movable member comprises a controlling step of controlling the position of the movable member according to an instruction value indicating a position of the movable member as a control target; a detecting step of detecting an amount of power supplied to the shape memory alloy member and determining whether or not this detected power amount is in excess of a first threshold value set beforehand; and a changing step of changing the instruction value to reduce the temperature of the shape memory alloy member when the power amount is determined to be in excess of the first threshold value in the detecting step.

According to the position control device and position control method constructed as above, the position of the movable member is controlled by detecting the amount of power supplied to the shape memory alloy member, determining whether or not this detected power amount is in excess of the first threshold value set beforehand, and changing the instruction value to reduce the temperature of the shape memory alloy member when the power amount is determined to be in excess of the first threshold value. Thus, the instruction value is changed to reduce the temperature of the shape memory alloy member and the position of the movable member is controlled even if such an instruction value that the amount of power supplied to the shape memory alloy member will be in excess of the first threshold value and the shape memory alloy member will be overheated continues to be input, for example, from an external apparatus. For example, the position of the movable member is controlled using such an instruction value as to maintain power supply while reducing the temperature of the shape memory alloy member. Therefore, the position control device and position control method constructed as above can protect a shape memory alloy without stopping a position control.

In another aspect, in the above position control device, the control unit includes a first holding section for holding the instruction value and a first controller for controlling the position of the movable member according to the instruction value held in the first holding section; and the changer unit includes a first calculator for calculating a change instruction value by changing the instruction value to reduce the temperature of the shape memory alloy member and a first rewriter for rewriting the instruction value held in the first holding section into the change instruction value calculated by the first calculator when the power amount is determined to be in excess of the first threshold value in the detector unit.

According to this construction, an instruction value input, for example, from an external apparatus is held (stored) in the first holding section and this held instruction value is changed. Thus, an instruction value can be held in the position control device separately from the instruction value given from the external apparatus, and this instruction value can be changed.

In another aspect, in the above position control device, the changer unit includes a second holding section for holding an offset value for offsetting the instruction value, a second calculator for calculating a change offset value by changing the offset value to reduce the temperature of the shape memory alloy member and a second rewriter for rewriting the offset value held in the second holding section into the change offset value calculated by the second calculator when the power amount is determined to be in excess of the first threshold value in the detector unit; and the control unit includes an offsetter for offsetting the instruction value using the offset value held in the second holding section and a second controller for controlling the position of the movable member according to the instruction value offset by the offsetter.

According to this construction, the instruction value is offset using the offset value and, by changing this offset value, the instruction value is changed. Thus, the offset value is held during the operation of the position control device, for example, by not initializing the offset value during the operation of the position control device while initializing the offset value to an initial value at the start-up of the position control device. Therefore, even if an instruction value input from an external apparatus is changed such as when the shape memory alloy member is overheated, an overheated state of the shape memory alloy member can be relatively quickly resolved.

In another aspect, in the above position control device, the changer unit includes a third holding section for holding a limit value, a third calculator for calculating a change limit value by changing the limit value to reduce the temperature of the shape memory alloy member and a third rewriter for rewriting the limit value held in the third holding section into the change limit value calculated by the third calculator when the power amount is determined to be in excess of the first threshold value in the detector unit; and the control unit includes a selector for comparing the instruction value and the limit value held in the third holding section and selecting the smaller one of the two values and a third controller for controlling the position of the movable member according to the instruction value selected by the selector.

According to this construction, the instruction value can be restricted by the limit value and, by changing this limit value, the instruction value can be changed.

In another aspect, in the above position control device, the detector unit determines that the power amount has exceeded the first threshold value when a current or voltage supplied to the shape memory alloy member exceeds a current threshold value or a voltage threshold value set beforehand and a duration, during which the threshold value is exceeded, exceeds a time threshold value set beforehand.

According to this construction, the amount of power supplied to the shape memory alloy member can be determined by a time accumulation value of current or voltage. Thus, the detector unit can have a relatively simple construction, and the above determination can be reliably made by using an established technology.

In another aspect, in the above position control device, a current or voltage is supplied to the shape memory alloy member by a PWM method; and the detector unit determines that the power amount has exceeded the first threshold value when a number of times, at which a pulse width of the current or voltage supplied to the shape memory alloy member by the PWM method exceeds a first pulse width threshold value, exceeds a first number threshold value.

According to this construction, power can be supplied to the shape memory alloy member by the PWM method (Pulse Width Modulation Method) and the detector can make the above determination also in such a case.

In another aspect, the above position control device further comprises a first initializing section for detecting the amount of power supplied to the shape memory alloy member and initializing the changer unit when the detected power amount is equal to or below a second threshold value set beforehand.

According to this construction, a continual state of a protection function can be automatically canceled and the protection function can work from an initial state on.

In another aspect, in the above position control device, a current or voltage is supplied to the shape memory alloy member by a PWM method; and a second initializing section is provided for detecting pulses of the current or voltage supplied to the shape memory alloy member by the PWM method and initializing the changer unit when pulse widths of the detected pulses are equal to or below a second pulse width threshold value set beforehand or a number of times, at which the first pulse width threshold value is exceeded, is equal to or below a second number threshold value set beforehand.

According to this construction, the continual state of the protection function can be automatically canceled and the protection function can work from the initial state on even when power is supplied to the shape memory alloy member by the PWM method (Pulse Width Modulation Method).

In another aspect, the above position control device further comprises a third initializing section for initializing the changer unit when the instruction value is equal to or below an instruction value threshold value set beforehand.

According to this construction, the continual state of the protection function can be automatically canceled and the protection function can work from the initial state on when the instruction value is equal to or below the instruction value threshold value set beforehand, for example, such as when the instruction value becomes sufficiently small.

In another aspect, the above position control device further comprises a fourth initializing section for initializing the changer unit when a command for initializing the changer unit is received from outside.

According to this construction, the continual state of the protection function can be automatically canceled and the protection function can work from the initial state on, for example, by giving a command for initializing the changer unit from outside, for example, by judgment of an external system or the like.

A drive device according to another aspect comprises a shape memory alloy actuator for moving a movable member using a shape memory alloy member by a bias applying method, and a position control device for controlling the position of the movable member, wherein the position control device is any one of the above position control devices.

According to this construction, there is provided a drive device with a position control device capable of protecting a shape memory alloy member without stopping a position control.

An imaging device according to another aspect comprises a shape memory alloy actuator for moving a movable member using a shape memory alloy member by a bias applying method, a lens which moves according to a movement of the movable member, an imaging element for imaging an optical image of a subject focused by an imaging optical system including the lens, and a position control device for controlling the position of the movable member, wherein the position control device is any one of the above position control devices.

According to this construction, there is provided an imaging device with a position control device capable of protecting a shape memory alloy member without stopping a position control.

In another aspect, the above imaging device further comprises an instruction value range determiner for detecting a movable limit position of the lens at the time of start-up and determining a range of the instruction value based on this detection result.

According to this construction, the range of the instruction value can be determined.

This application is a U.S. National Phase Application under 35 U.S.C. 371 of International Application No. PCT/JP2009/058781, based on Japanese Patent Application Serial Number 2008-133220 filed on May 21, 2008, the content of which is incorporated herein.

The present invention has been appropriately and sufficiently described above to be expressed by way of embodiments with reference to the drawings, but it should be appreciated that a person skilled in the art can easily modify and/or improve the above embodiments. Accordingly, a modified embodiment or improved embodiment carried out by the person skilled in the art should be interpreted to be embraced by the scope as claimed unless departing from the scope as claimed.

INDUSTRIAL APPLICABILITY

According to the present invention, it is possible to provide a position control device, a position control method and a drive device and an imaging device including this position control device.

What is claimed is:

1. A position control device used in a shape memory alloy actuator for moving a movable member using a shape memory alloy member by a biasing applying method and adapted to control the position of the movable member, comprising:
 a control unit configured to control a position of the movable member according to an instruction value indicating a position of the movable member as a control target;
 a detector unit configured to detect an amount of power supplied to the shape memory alloy member and to determine whether or not the detected power amount is in excess of a first threshold value; and
 a changer unit configured to change the instruction value to reduce a temperature of the shape memory alloy member when the power amount is determined to be in excess of the first threshold value by the detector unit.

2. The position control device according to claim 1, wherein:
 the control unit includes a first holding section configured to hold the instruction value and a first controller configured to control the position of the movable member according to the instruction value held in the first holding section; and
 the changer unit includes a first calculator configured to calculate a change instruction value by changing the instruction value to reduce the temperature of the shape memory alloy member and a first rewriter configured to rewrite the instruction value held in the first holding section into the change instruction value calculated by the first calculator when the power amount is determined to be in excess of the first threshold value in the detector unit.

3. The position control device according to claim 1, wherein:
 the changer unit includes a second holding section configured to hold an offset value for offsetting the instruction value, a second calculator configured to calculate a change offset value by changing the offset value to reduce the temperature of the shape memory alloy member and a second rewriter configured to rewrite the offset value held in the second holding section into the change offset value calculated by the second calculator when the power amount is determined to be in excess of the first threshold value in the detector unit; and
 the control unit includes an offsetter configured to offset the instruction value using the offset value held in the second holding section and a second controller configured to control the position of the movable member according to the instruction value offset by the offsetter.

4. The position control device according to claim 1, wherein:
 the changer unit includes a third holding section configured to hold a limit value, a third calculator configured to calculate a change limit value by changing the limit value to reduce the temperature of the shape memory alloy member and a third rewriter configured to rewrite the limit value held in the third holding section into the change limit value calculated by the third calculator when the power amount is determined to be in excess of the first threshold value in the detector unit; and
 the control unit includes a selector configured to compare the instruction value and the limit value held in the third holding section and select a smaller one of the two values and a third controller configured to control the position of the movable member according to the instruction value selected by the selector.

5. The position control device according to claim 1, wherein:
the detector unit determines that the power amount has exceeded the first threshold value when a current or voltage supplied to the shape memory alloy member exceeds a current threshold value or a voltage threshold value and a duration during which the threshold value exceeds a time threshold value.

6. The position control device according to claim 5, wherein: the current threshold value or the voltage threshold value is a preset value and the time threshold value is preset.

7. The position control device according to claim 1, wherein:
a current or voltage is supplied to the shape memory alloy member by a pulse width modulation (PWM) method; and
the detector unit determines that the power amount has exceeded the first threshold value when a number of times that a pulse width of the current or voltage supplied to the shape memory alloy member by the PWM method exceeds a first pulse width threshold value exceeds a first number threshold value.

8. The position control device according to claim 7, wherein:
a current or voltage is supplied to the shape memory alloy member by a pulse width modulation (PWM) method; and
the position control device further comprises a second initializing section configured to detect pulses of the current or voltage supplied to the shape memory alloy member by the PWM method and initialize the changer unit when pulse widths of the detected pulses are equal to or below a second pulse width threshold value or a number of times the first pulse width threshold value is exceeded, is equal to, or is below a second number threshold value.

9. The position control device according to claim 1, further comprising:
a first initializing section configured to detect the amount of power supplied to the shape memory alloy member and initialize the changer unit when the detected power amount is equal to or below a second threshold value.

10. The position control device according to claim 9, wherein: the second threshold value is preset.

11. The position control device according to claim 1, further comprising:
a third initializing section configured to initialize the changer unit when the instruction value is equal to or below a preset instruction value threshold value set beforehand.

12. The position control device according to claim 1, further comprising: a fourth initializing section configured to initialize the changer unit when a command for initializing the changer unit is received from outside.

13. The position control device according to claim 1, wherein: the first threshold value is a preset value.

14. A position control method used in a shape memory alloy actuator for moving a movable member using a shape memory alloy member by a biasing applying method and adapted to control the position of the movable member, comprising:
controlling the position of the movable member according to an instruction value indicating a position of the movable member as a control target;
detecting an amount of power supplied to the shape memory alloy member;
determining whether or not the detected power amount is in excess of a preset first threshold value set; and
changing the instruction value to reduce the temperature of the shape memory alloy member when the power amount is determined to be in excess of the detected first threshold value.

15. A drive device, comprising:
a shape memory alloy actuator configured to move a movable member using a shape memory alloy member by a bias applying method; and
a position control device configured to control the position of the movable member, wherein the position control device includes:
a control unit configured to control the position of the movable member according to an instruction value indicating a position of the movable member as a control target;
a detector unit configured to detect an amount of power supplied to the shape memory alloy member and determine whether or not the detected power amount is in excess of a preset first threshold value; and
a changer unit configured to change the instruction value to reduce a temperature of the shape memory alloy member when the power amount is determined to be in excess of the first threshold value by the detector unit.

16. An imaging device, comprising:
a movable member;
a shape memory alloy actuator configured to move the movable member using a shape memory alloy member by a bias applying method;
a lens that moves according to a movement of the movable member;
an imaging element configured to image an optical image of a subject focused by an imaging optical system including the lens; and
a position control device configured to control a position of the movable member, wherein the position control device includes:
a control unit configured to control the position of the movable member according to an instruction value indicating a position of the movable member as a control target;
a detector unit configured to detect an amount of power supplied to the shape memory alloy member and determine whether or not the detected power amount is in excess of a preset first threshold value; and
a changer unit configured to change the instruction value to reduce a temperature of the shape memory alloy member when the power amount is determined to be in excess of the first threshold value by the detector unit.

17. The imaging device according to claim 16, further comprising:
an instruction value range determiner configured to detect a movable limit position at a time of start-up and determine a range of the instruction value based on this detection result.

* * * * *